US010727593B2

(12) United States Patent
Yamaguchi et al.

(10) Patent No.: US 10,727,593 B2
(45) Date of Patent: *Jul. 28, 2020

(54) ANTENNA, ANTENNA DEVICE AND COMMUNICATION DEVICE

(71) Applicant: Panasonic Intellectual Property Management Co., Ltd., Osaka (JP)

(72) Inventors: Shuichiro Yamaguchi, Osaka (JP); Masaaki Sano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,278

(22) Filed: Sep. 4, 2018

(65) Prior Publication Data

US 2018/0375211 A1    Dec. 27, 2018

Related U.S. Application Data

(63) Continuation of application No. 14/783,796, filed as application No. PCT/JP2014/001956 on Apr. 3, 2014, now Pat. No. 10,096,903.

(30) Foreign Application Priority Data

Apr. 12, 2013  (JP) .................................. 2013-083534
May 17, 2013  (JP) .................................. 2013-104718

(51) Int. Cl.
  *H01Q 7/08*   (2006.01)
  *H01Q 1/24*   (2006.01)
  (Continued)

(52) U.S. Cl.
  CPC ................ *H01Q 7/08* (2013.01); *H01Q 1/22* (2013.01); *H01Q 1/2216* (2013.01);
  (Continued)

(58) Field of Classification Search
  CPC ........ H01Q 1/243; H01Q 1/38; H01Q 9/0421; H01Q 1/42; H01Q 7/08; H01Q 1/22;
  (Continued)

(56) References Cited

U.S. PATENT DOCUMENTS 7,694,886 B2   4/2010   Tan et al.
8,976,075 B2   3/2015   Kato et al.
    (Continued)

FOREIGN PATENT DOCUMENTS

JP        63000507 U    1/1988
JP     2002-183695 A    6/2002
    (Continued)

OTHER PUBLICATIONS

International Search Report dated Jul. 8, 2014, for corresponding International Application No. PCT/JP2014/001956, 4 pages.

*Primary Examiner* — Ab Salam Alkassim, Jr.
(74) *Attorney, Agent, or Firm* — Seed IP Law Group LLP

(57) ABSTRACT

Provided is an antenna that can facilitate favorable communications even if no metal body is located near the antenna and even if the antenna is located within a metal body. An antenna is characterized in that the antenna comprises: a core (11) having a plane; a coil winding part (area B) of the plane about which a coil is wound; and no-coil winding parts (areas A, C) of the plane about which no coil is wound, wherein the coil winding part is sandwiched between the no-coil winding parts in the axial direction of the coil on the plane, and the width of the plane in the axial direction of the coil is equal to or greater than the width of the plane in the winding direction of the coil.

9 Claims, 35 Drawing Sheets

(51) Int. Cl.
  *H01Q 1/38* (2006.01)
  *H04B 5/00* (2006.01)
  *H01Q 1/22* (2006.01)
  *H01Q 7/00* (2006.01)
  *H04W 4/80* (2018.01)

(52) U.S. Cl.
  CPC ............... *H01Q 1/243* (2013.01); *H01Q 1/38* (2013.01); *H01Q 7/00* (2013.01); *H04B 5/0081* (2013.01); *H04W 4/80* (2018.02)

(58) Field of Classification Search
  CPC ......... H01Q 1/2216; H01Q 7/00; H04W 4/80; H04B 5/0081
  USPC ........................ 343/702, 787, 788, 866, 872
  See application file for complete search history.

(56) References Cited

U.S. PATENT DOCUMENTS

| | | | |
|---|---|---|---|
| 9,000,619 B2 | 4/2015 | Kato et al. | |
| 9,065,182 B2 | 6/2015 | Kato et al. | |
| 9,083,073 B2* | 7/2015 | Yang | H01Q 1/22 |
| 9,466,871 B2* | 10/2016 | Nakano | H01Q 1/243 |
| 9,756,155 B2* | 9/2017 | Ettel | H04B 5/0081 |
| 10,096,903 B2* | 10/2018 | Yamaguchi | H01Q 1/243 |
| 10,224,601 B2* | 3/2019 | Yamaguchi | H01Q 13/16 |
| 2004/0074974 A1 | 4/2004 | Senba et al. | |
| 2005/0162331 A1 | 7/2005 | Endo et al. | |
| 2007/0023517 A1 | 2/2007 | Tan et al. | |
| 2009/0153412 A1* | 6/2009 | Chiang | H01Q 15/006 |
| | | | 343/702 |
| 2009/0278757 A1* | 11/2009 | Ahn | H01Q 13/106 |
| | | | 343/767 |
| 2011/0014955 A1* | 1/2011 | Kim | H04M 1/22 |
| | | | 455/566 |
| 2011/0287715 A1* | 11/2011 | Matsuura | H01Q 1/2225 |
| | | | 455/41.1 |
| 2012/0025939 A1 | 2/2012 | Yamaguchi et al. | |
| 2012/0091821 A1* | 4/2012 | Kato | G06K 19/07779 |
| | | | 307/104 |
| 2012/0262357 A1* | 10/2012 | Kato | G06K 19/07779 |
| | | | 343/788 |
| 2012/0306714 A1* | 12/2012 | Yosui | H01Q 1/2208 |
| | | | 343/788 |
| 2012/0327621 A1* | 12/2012 | Rhyu | H01Q 1/243 |
| | | | 361/760 |
| 2013/0113662 A1 | 5/2013 | Kato et al. | |
| 2013/0135165 A1* | 5/2013 | Yamaguchi | H01Q 7/06 |
| | | | 343/788 |
| 2013/0207852 A1* | 8/2013 | Nakano | H01Q 1/22 |
| | | | 343/702 |
| 2013/0234905 A1 | 9/2013 | Kato et al. | |
| 2013/0300622 A1 | 11/2013 | Kato et al. | |
| 2013/0307746 A1 | 11/2013 | Nakano et al. | |
| 2014/0015724 A1* | 1/2014 | Bungo | H01Q 13/10 |
| | | | 343/767 |
| 2014/0159974 A1 | 6/2014 | Kato et al. | |
| 2014/0191916 A1 | 7/2014 | Ito | |
| 2014/0247188 A1* | 9/2014 | Nakano | H04B 5/0031 |
| | | | 343/702 |
| 2014/0340273 A1* | 11/2014 | Kato | H01Q 1/243 |
| | | | 343/788 |
| 2015/0171509 A1 | 6/2015 | Kato et al. | |
| 2015/0207223 A1* | 7/2015 | Nakano | H01Q 1/243 |
| | | | 343/702 |
| 2015/0222009 A1* | 8/2015 | Asou | H01Q 7/00 |
| | | | 343/702 |
| 2016/0268672 A1* | 9/2016 | Liu | H01Q 1/48 |
| 2016/0315669 A1* | 10/2016 | Shi | H01Q 1/2225 |
| 2016/0372818 A1* | 12/2016 | Nakano | H01Q 1/48 |
| 2017/0077597 A1* | 3/2017 | Gong | H04W 4/80 |
| 2017/0346163 A1* | 11/2017 | Lee | H01Q 1/2283 |

FOREIGN PATENT DOCUMENTS

| | | |
|---|---|---|
| JP | 2002-208876 A | 7/2002 |
| JP | 2002-252518 A | 9/2002 |
| JP | 2004-333242 A | 11/2004 |
| JP | 2007-041666 A | 2/2007 |
| JP | 2010-066044 A | 3/2010 |
| JP | 2010-119003 A | 5/2010 |
| JP | 5177314 B2 | 4/2013 |
| WO | 2013/051684 A1 | 4/2013 |

\* cited by examiner

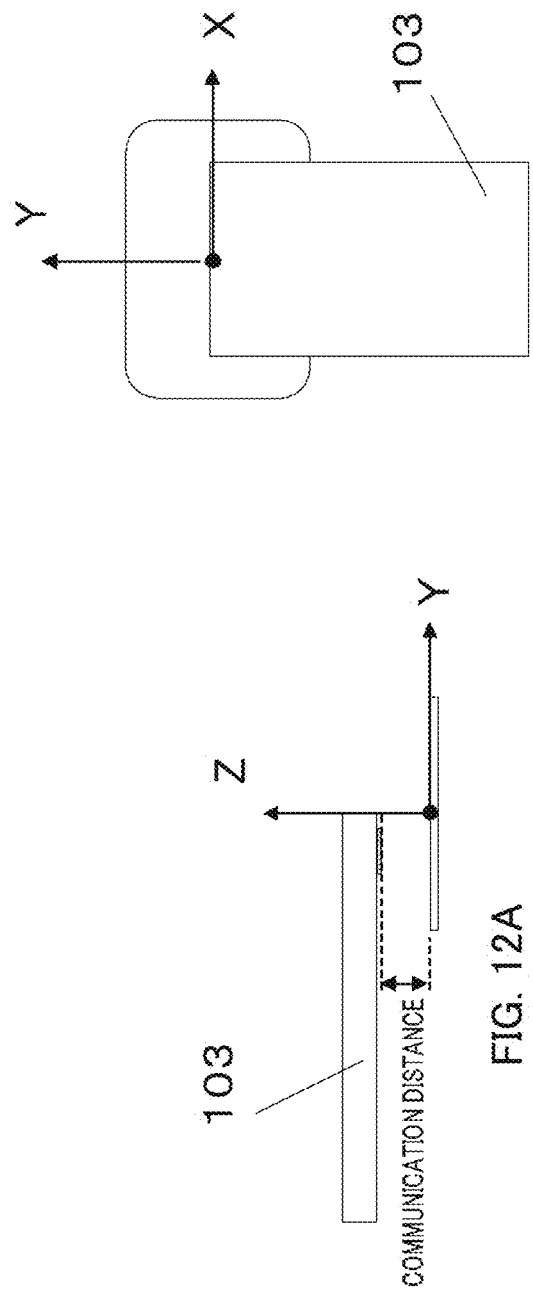
FIG. 12A
FIG. 12B
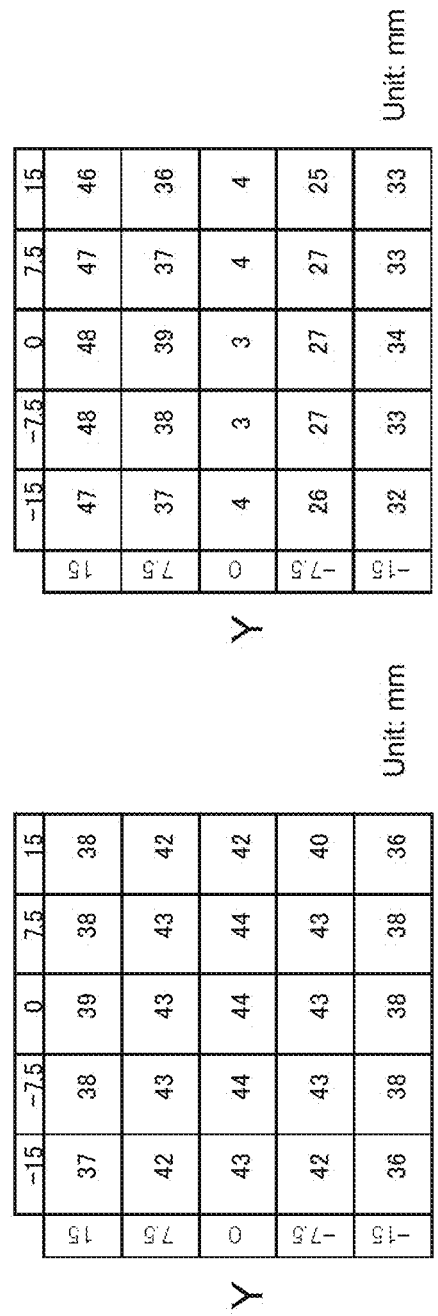
FIG. 12C
FIG. 12D

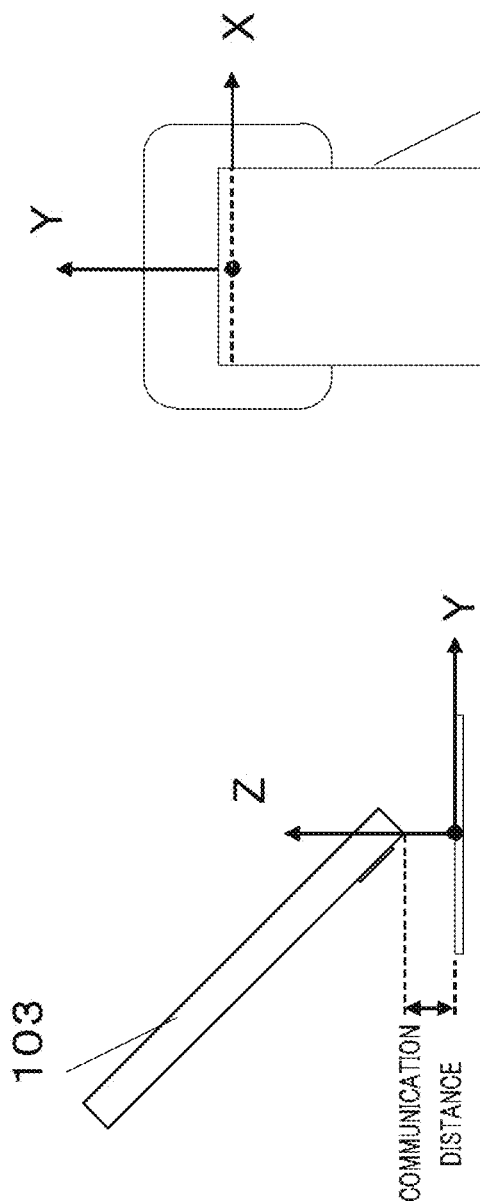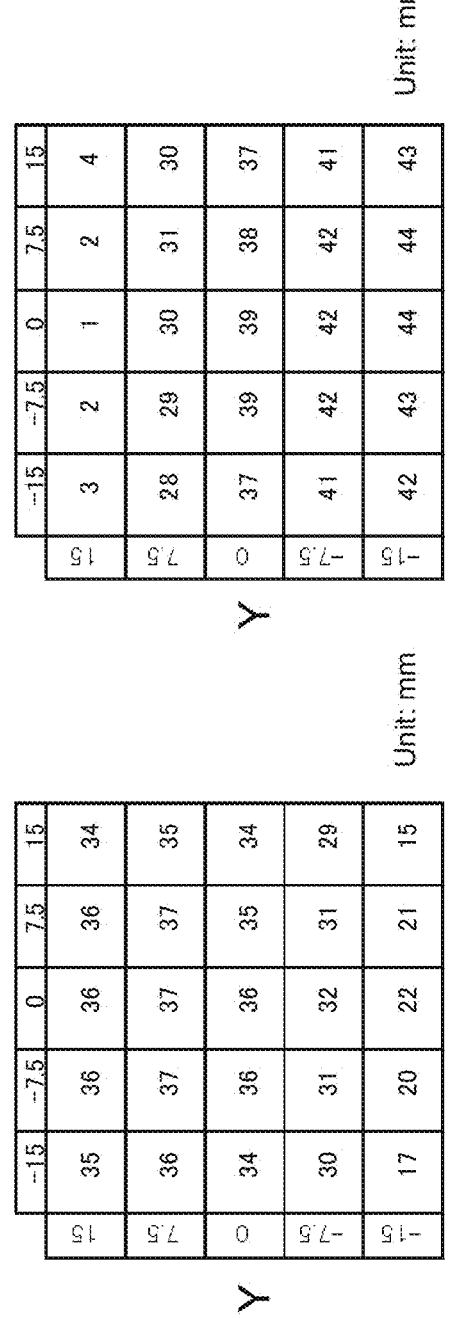

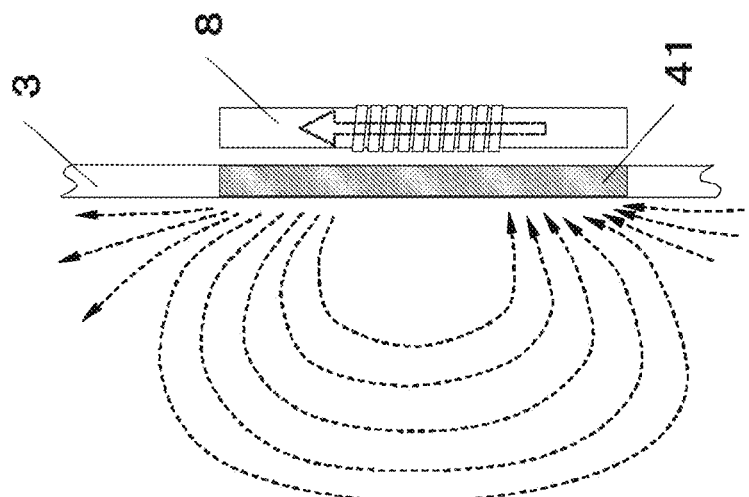
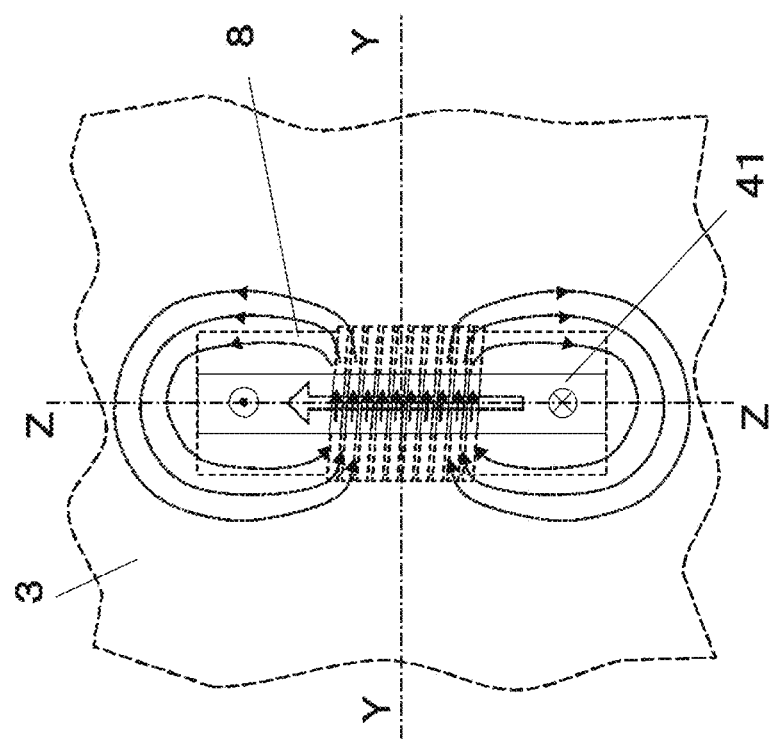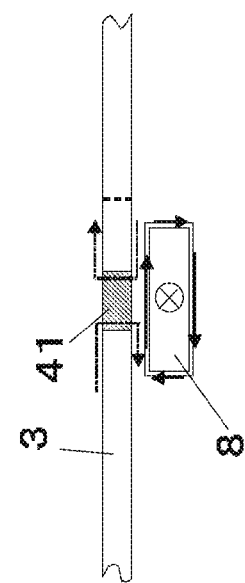
FIG. 21A
FIG. 21B
FIG. 21C

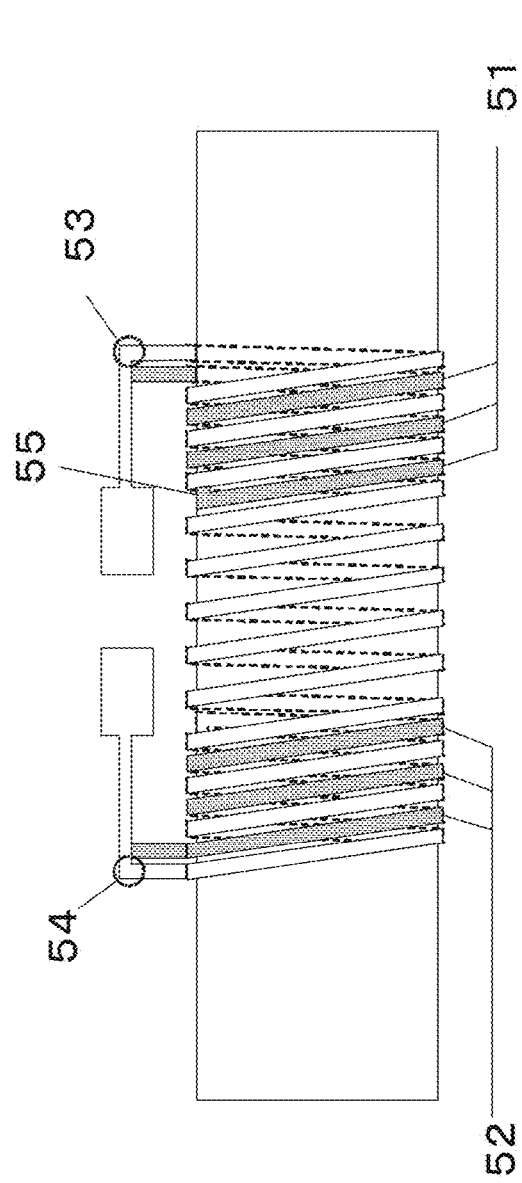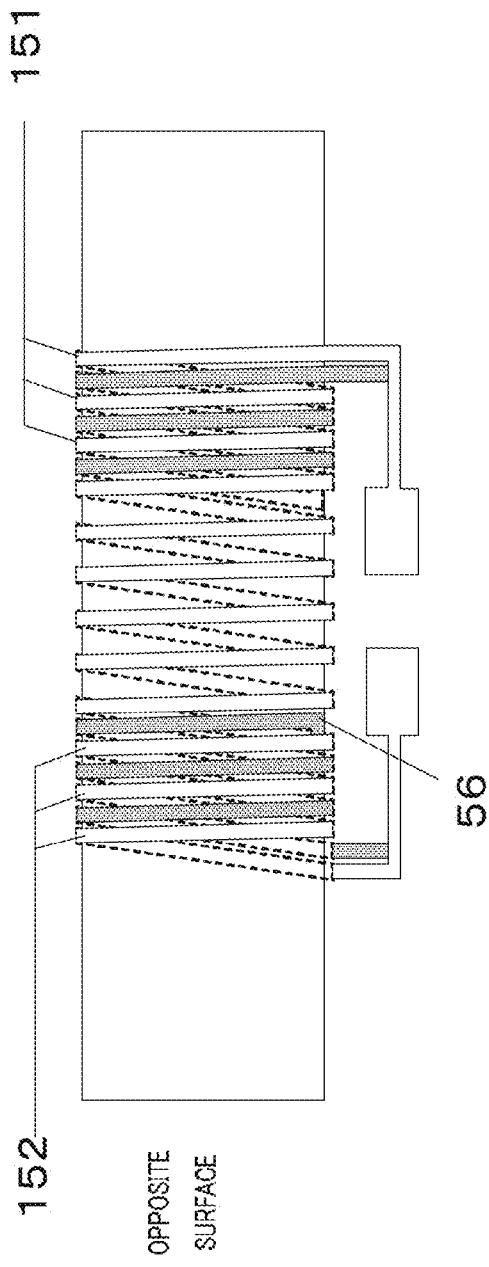
FIG. 23A
FIG. 23B

| STATE | NO DISCONNECTION | DISCONNECTION AT TWO TRIMMING POINTS | L VALUE CHANGE (%) |
|---|---|---|---|
| FREE SPACE | 2169nH | 2277nH | 5.0% |
| METAL PROXIMITY 1 | 1047nH | 1096nH | 4.7% |
| METAL PROXIMITY 2 | 603nH | 631nH | 4.6% |

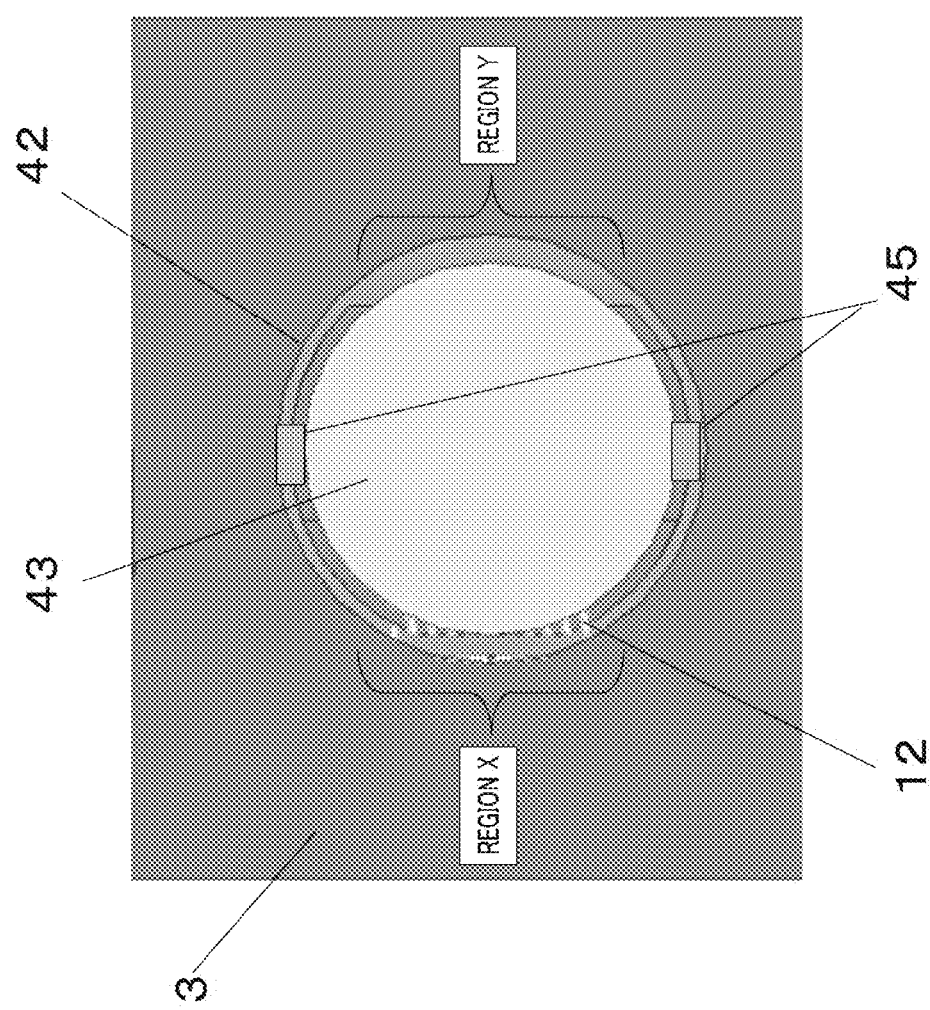

ANTENNA, ANTENNA DEVICE AND COMMUNICATION DEVICE

TECHNICAL FIELD

The present invention relates to an antenna, an antenna apparatus and a communication apparatus that communicate with a radio communication medium: IC CARD such as an RF-ID or NFC, or IC tag.

BACKGROUND ART

Conventionally, when an antenna is mounted in a metal case, the metal body cancels out a magnetic flux generated by the antenna, so that a magnetic field generated by the antenna may not reach the outside of the metal body, making it difficult to maintain a communication characteristic of the antenna.

In this respect, a technique is proposed which provides the metal body with a through hole and a slot connecting an end portion of the metal body and the through hole, and arranges a loop antenna around the through hole so as to overlap with the metal body (e.g., see PTL 1). This makes it possible to carry out communication rather using the metal body.

CITATION LIST

Patent Literature

PTL 1
Japanese Patent Publication No. 5177314

SUMMARY OF INVENTION

Technical Problem

Here, the communication characteristic degrades as the opening area of an antenna increases. However, the technique described in PTL 1 requires formation of a through hole having a size approximately the same as the opening area of the antenna in the metal body, and it is thus difficult to reduce the size of the through hole. Moreover, according to the technique described in PTL 1, the slot connecting the end portion of the metal body and the through hole is always required, so that the degree of freedom of antenna arrangement is limited by the slot. Furthermore, according to the technique described in PTL 1, the antenna alone cannot obtain a favorable communication characteristic without using the metal body.

Therefore, an object of the present invention is to provide an antenna, an antenna apparatus and a communication apparatus having a favorable communication characteristic even when no metal body is located nearby, and capable of easily carrying out favorable communication with the outside of the metal body by only providing a simple slot or a hole in the metal body even when the antenna is placed in the metal body.

Solution to Problem

An antenna according to an aspect of the present invention includes: a core including a surface; a coil winding part that is a portion of the surface around which a coil is wound; and a plurality of no-coil winding parts each being a portion of the surface around which no coil is wound, in which the coil winding part is positioned between the plurality of no-coil winding parts in a first direction on the surface, and a width of the surface in the first direction is equal to or greater than a width of the surface in a second direction perpendicular to the first direction.

Advantageous Effects of Invention

According to the present invention, a favorable communication characteristic can be provided without the metal body located nearby and carry out favorable communication with the outside of the metal body by only providing a simple slot or a hole in the metal body even when the antenna is placed in the metal body. Even when part of the hole is covered by the metal body, it is possible to carry out communication and to reduce the area of the hole.

BRIEF DESCRIPTION OF DRAWINGS

FIGS. 12A to 12D are diagrams illustrating a communicable distance of the antenna according to Embodiment 1 and the antenna in FIG. 7 when the antennas are placed opposite to each other in parallel;

FIGS. 13A to 13D are diagrams illustrating a communicable distance of the antenna according to Embodiment 1 and the antenna in FIG. 7 when the antennas are placed opposite to each other at an angle of 45 degrees;

FIGS. 21A to 21C are diagrams illustrating a relationship between the magnetic flux generated by the antenna according to Embodiment 1, the back cover and the slot;

FIGS. 23A and 23B are top views of the antenna provided with an inductance adjusting mechanism according to Embodiment 1;

FIG. 35 is a diagram illustrating a connection between the cap and the back cover in the antenna according to Embodiment 2.

DESCRIPTION OF EMBODIMENTS

An antenna according to an aspect of the present invention includes a core provided with a surface, a coil winding part of the surface around which a coil is wound and a plurality of no-coil winding parts of the surface around which no coil is wound, in which the coil winding part is positioned between the plurality of no-coil winding parts in a first direction on the surface and a width of the surface in the first direction is equal to or greater than a width in a second direction perpendicular to the first direction. This antenna exhibits a favorable communication characteristic even when the metal body is not located nearby and can easily perform favorable communication with the outside of the metal body by only providing a simple slot in the metal body even when the antenna is located in the metal body.

Embodiment 1

Figure 1:
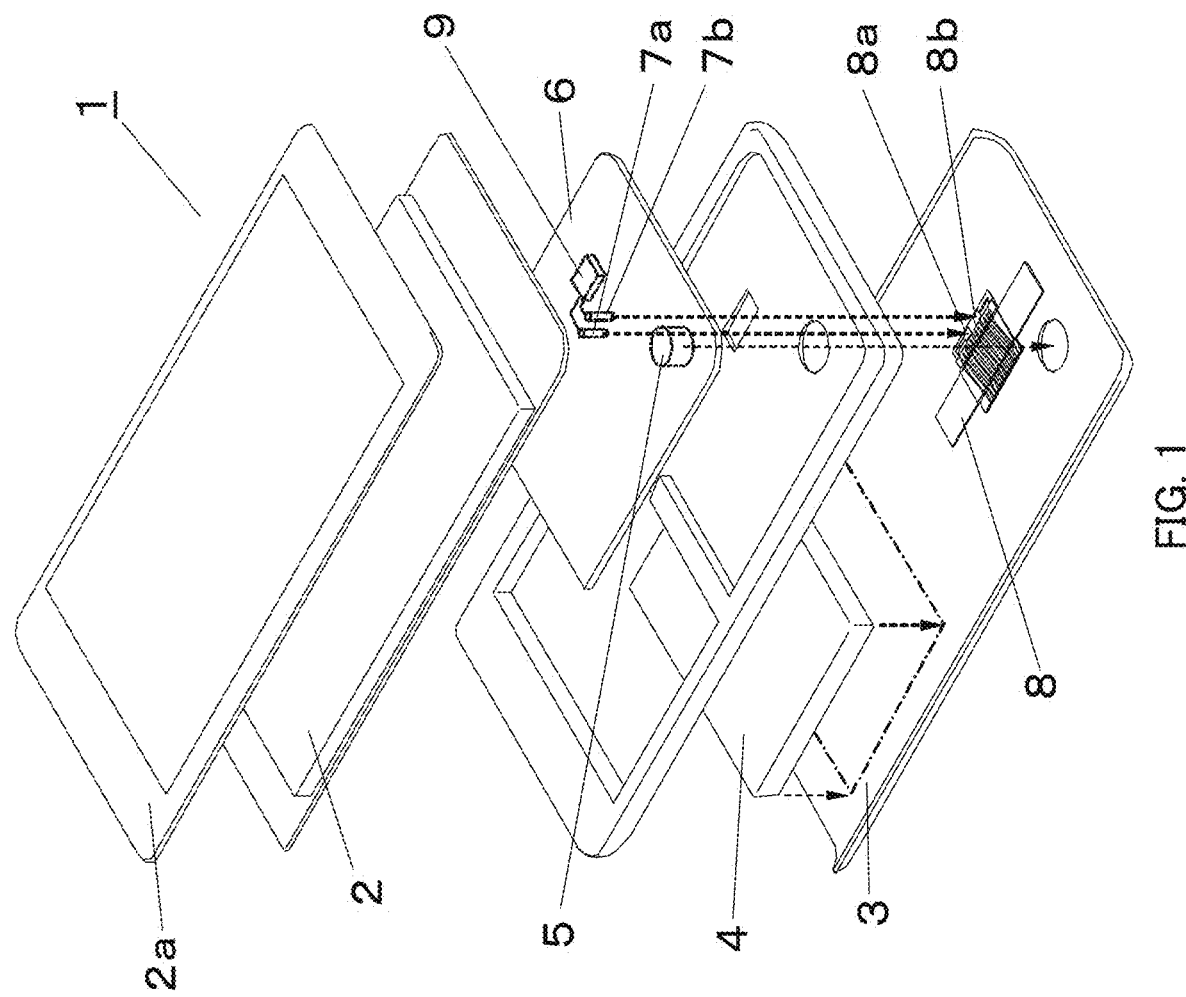
FIG. 1 is an exploded perspective view of a portable terminal in which an antenna according to Embodiment 1 is mounted.

FIG. 1 is an exploded perspective view of a portable terminal in which an antenna according to Embodiment 1 of the present invention is mounted. Portable terminal 1 is composed of display panel 2; back cover 3; and battery 4, camera 5, and electronic circuit board 6 or the like housed between display panel 2 and back cover 3. Display panel 2 shown in FIG. 1 is of a touch panel type and FIG. 1 illustrates a panel without operation buttons, but display panel 2 may or may not be of a touch panel type, and may be provided with operation buttons separately. Display panel 2 is a liquid crystal panel and is provided with panel cover 2a. Back cover 3 is mounted with antenna 8 according to Embodiment 1 which is attached using an adhesive tape or fixed using a screw or the like. Back cover 3 may be a non-metal body such as resin or a metal body. Back cover 3 in FIG. 1 is resin. Note that in FIG. 1, antenna 8 is located so as not to overlap camera 5. Antenna 8 may be located so as to overlap battery 4, but locating antenna 8 so as to overlap thinner electronic circuit board 6 makes it possible to reduce the thickness of portable terminal 1 as a whole. Note that in Embodiment 1, antenna 8 is located on a flat part of back cover 3, but antenna 8 may be located on a curved surface of back cover 3. As shown in FIG. 1, a longitudinal direction of back cover 3 and an axis direction (longitudinal direction) of the coil of antenna 8 may be preferably identical. In this way, a communication direction of antenna 8 becomes a direction more convenient to the user.

External connection terminals 8a and 8b are provided on a surface of antenna 8 opposite to electronic circuit board 6 for forming an antenna apparatus by making connection with electronic circuit board 6. Pin contact, connector connection or soldering of a lead wire or the like may be possibly used for connection between electronic circuit board 6 and antenna 8. In Embodiment 1, electronic circuit board 6 includes antenna input and output pins 7a and 7b. As is generally known, an assumption is made that antenna input and output pins 7a and 7b are connected to antenna control section 9 on electronic circuit board 6 on which a matching circuit and a control IC or the like are arranged. An antenna apparatus is formed by antenna input and output pins 7a and 7b being connected to a coil section including, as two ends of the coil section, terminals 8a and 8b provided for antenna 8. Note that, components such as another frequency antenna, a speaker, an RF module as well as an RF-ID IC and a matching circuit are arranged in a space formed between back cover 3 and display panel 2.

Figure 2:
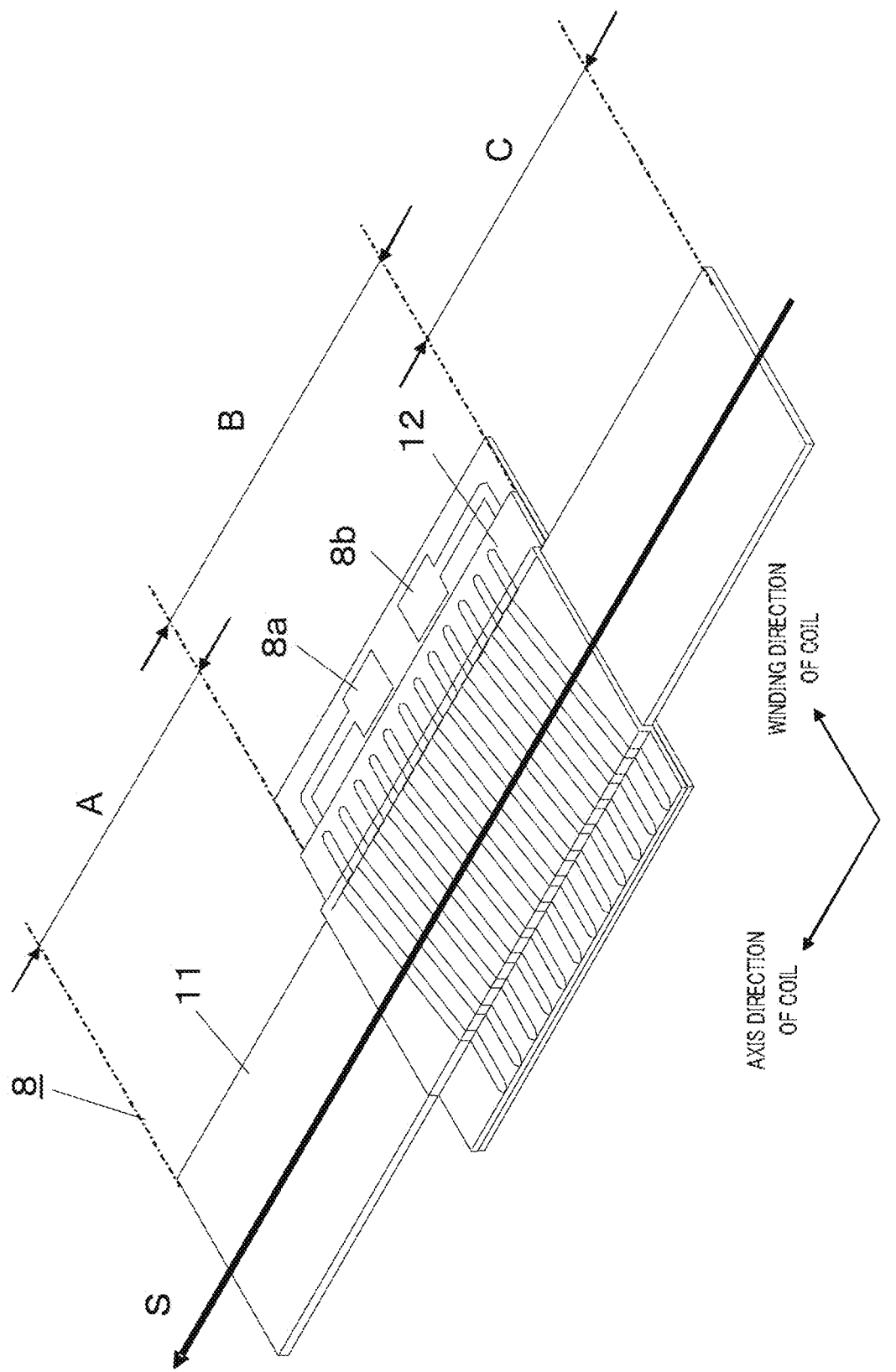
FIG. 2 is a perspective view of the antenna according to Embodiment 1.
Figure 3:
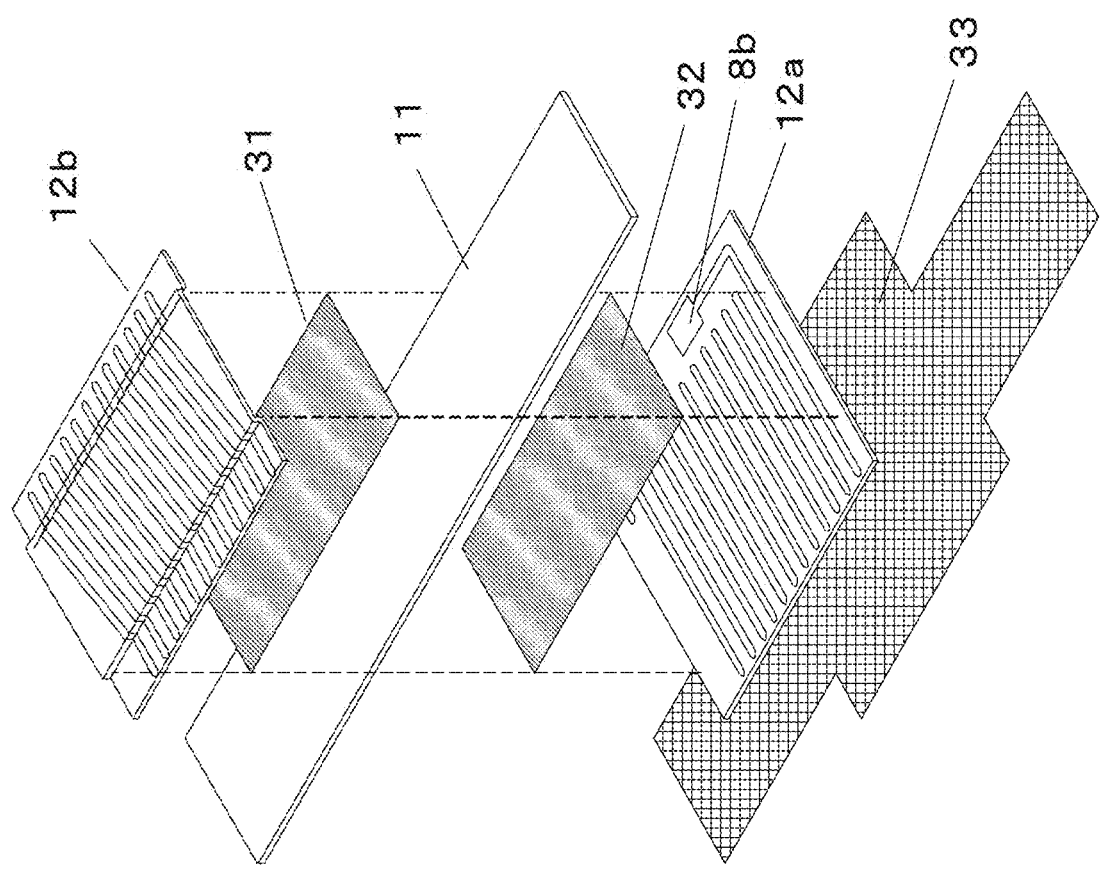
FIG. 3 is an exploded perspective view of the antenna according to Embodiment 1.
Figure 4:
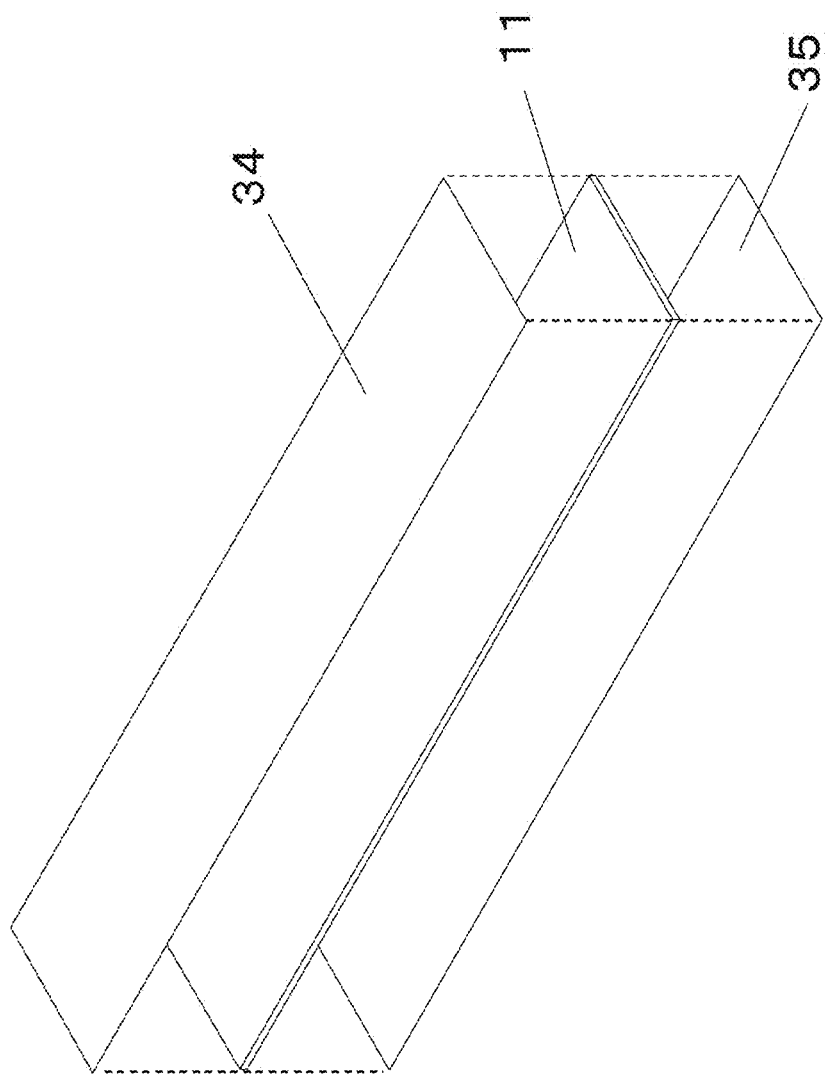
FIG. 4 is a perspective view of a core according to Embodiment 1.

FIG. 2 is a perspective view of the antenna according to Embodiment 1. FIG. 3 is an exploded perspective view of the antenna according to Embodiment 1. Furthermore, FIG. 4 is a perspective view of a core according to Embodiment 1.

As shown in FIG. 2, antenna 8 of Embodiment 1 includes: thin plate-like core 11 provided with a surface; and a coil winding part (region B) of the surface around which a coil is wound and a plurality of no-coil winding parts (regions A and C) of the surface around which no coil is wound. The coil winding part is positioned between the plurality of no-coil winding parts in the axis direction on the surface, and the width of the surface in the axis direction of the coil (first direction) is equal to or greater than the width of the coil in the winding direction of the coil (second direction). More preferably, core 11 has a plate-like shape having a substantially rectangular surface as the front surface or back surface of the shape, and the coil is wound so that the widthwise direction of the surface and the axis direction of the coil cross each other. The axis direction of the coil is preferably substantially the same as the longitudinal direction of the surface of core 11 (within ±10 degrees). The expression "core 11 has a plate-like shape" means that the thickness of core 11 is very small compared to the width of the surface of core 11 in the longitudinal direction or lateral direction, is not greater than 10% of the width of the surface and is preferably not greater than 5%.

An overall length of the plurality of no-coil winding parts (regions A and C) in the axis direction of the coil may be equal to or greater than the length of the coil winding part (region B). That is, the sum of the lengths of regions A and C in the axis direction of the coil is equal to or greater than the length of region B and the length of core 11 is equal to or greater than two times the length of region B. More preferably, the respective lengths of the plurality of no-coil winding parts (regions A and C) are substantially the same as the length of the coil winding part (region B). That is, the length of core 11 in the axis direction of the coil is roughly three times the length of region B.

More specifically, antenna 8 includes: core 11 made of a magnetic substance such as ferrite, amorphous, silicon steel, permalloy or a soft magnetic material; and flexible substrate 12 which is arranged so as to surround core 11 and in which a coil pattern (lead wire) that is an antenna pattern or the like is formed on a support body which is mainly made of resin. In Embodiment 1, core 11 is made of ferrite, has a size of 40×10×0.3 mm, and the size may become approximately 39.5 to 40.5 mm×9.7 to 10.3 mm×0.27 to 0.33 mm due to a variation in dimensions after sintering. The shape of core 11 is parallelepiped, rectangular parallelepiped plate in particular, and the two large surfaces are preferably rectangular but may also be square. The term "coil pattern" used herein refers to a coil pattern that generates magnetic lines of force for communication with a radio communication medium such as IC CARD and IC tag (not shown) assuming arrow S as the coil axis. The coil pattern is normally formed of a copper foil formed between two resin layers of a polyimide film and a cover-lay (cover layer) or resist in flexible substrate 12, for example. The coil pattern is wound around this coil axis S as substantially the center and coil axis S is substantially perpendicular to the coil pattern of flexible substrate 12. Note that the lead wire is not limited to one based on a conductor pattern, but may be one in which a metal wire is wound around core 11 or a conductor film may be formed on core 11 or may be in any form. External connection terminals 8a and 8b are located outside core 11.

The longitudinal direction of core 11 is identical to the direction of coil axis S as shown in FIG. 2 and the traverse direction thereof is identical to the winding direction of the coil pattern. Setting the width of core 11 in the longitudinal direction to at least two times or preferably three times the width in the widthwise direction allows even a small coil pattern to bring about an effect as if a large antenna were formed. Details thereof will be described later.

As shown in FIG. 3, flexible substrate 12 is divided into two portions with core 11 placed in between. In Embodiment 1, among the two parts of flexible substrate 12 resulting from the division, the part including external connection terminals 8a and 8b is designated as lower flexible substrate 12a and the part not including external connection terminals 8a and 8b is designated as upper flexible substrate 12b for convenience. As will be described in more detail later, lower flexible substrate 12a and upper flexible substrate 12b are joined together by solder. In Embodiment 1, lower flexible substrate 12a and upper flexible substrate 12b are joined along two sides of flexible substrate 12 which are substantially parallel to coil axis S. The terms "lower" and "upper" are used for convenience to facilitate an understanding in FIG. 3 and "lower" and "upper" may be reversed when antenna 8 is mounted on a device.

In order to fix core 11 between lower flexible substrate 12a and upper flexible substrate 12b, double-coated adhesive tapes 31 and 32 are used as adhesive layers in Embodiment 1. That is, double-coated adhesive tape 32 is pasted between core 11 and lower flexible substrate 12a, and double-coated adhesive tape 31 is pasted between core 11 and upper flexible substrate 12b. Flexible substrate 12 further includes double-coated adhesive tape 33 to paste antenna 8 to the back cover in FIG. 1.

Since core 11 inevitably has a portion exposed from flexible substrate 12, entire core 11 is securely protected by protective tapes 34 and 35 from both sides as shown in FIG. 4. That is, since core 11 has characteristics easily changeable due to damage or the like, it has a protective member apart from flexible substrate 12. In Embodiment 1, core 11 is made up of a ferrite sintered body which is pulverized into a plurality of small pieces beforehand to have flexibility. Core 11 includes protective tapes 34 and 35 also to keep these small pieces in a sheet-like form. Thus, even when the portion pasted to back cover 3 has a curved surface, antenna 8 can be pasted and placed along the curved surface. Furthermore, pulverizing core 11 into small pieces makes it difficult for core 11 to be broken further, thus making it possible to prevent deterioration of the characteristics deterioration, which would otherwise be caused by breakage.

The method of fixing core 11 to flexible substrate 12 need not always be attachment of a double-coated adhesive tape to both sides of core 11 as shown in Embodiment 1.

Embodiment 1 will be described using FIG. 3 again. As described above, lower flexible substrate 12a and upper flexible substrate 12b making up flexible substrate 12 are joined together by soldering between lead wires along two sides of flexible substrate 12 substantially parallel to coil axis S. Thus, lower flexible substrate 12a and upper flexible substrate 12b together form a coil pattern.

Next, a description will be given of the sizes of core 11 and flexible substrate 12, which are one of the features of antenna 8 of Embodiment 1. As described above, core 11 has a shape elongated in the longitudinal direction, for example, the width in the longitudinal direction being four times the width in the widthwise direction. Flexible substrate 12 is located substantially at the center (region B in FIG. 2) in the longitudinal direction of core 11. A magnetic flux is generated most efficiently when flexible substrate 12 is substantially at the center in the longitudinal direction of core 11, but flexible substrate 12 may be located at a different position depending on the use. With respect to the width of core 11 in the longitudinal direction, the width of flexible substrate 12 in the same direction is small and may be preferably equal to or less than half the width of core 11 in the longitudinal direction. In Embodiment 1, the width of flexible substrate 12 in the longitudinal direction of core 11 is 20 mm. In FIG. 2, the width of core 11 in the longitudinal direction is roughly region A:region B:region C=1:2:1. In contrast, with respect to the width of core 11 in the widthwise direction, the width of flexible substrate 12 in the same direction is large, and larger by the length necessary for lower flexible substrate 12a and upper flexible substrate 12b to be joined together by solder or the like.

Adopting the shape mentioned above can make both miniaturization of antenna 8 and characteristic improvement at the same time. That is, region B provided with flexible substrate 12 has a large thickness compared to region A and region C not provided with flexible substrate 12. That is, minimizing region B in antenna 8 can achieve thinner and smaller antenna 8. Smaller region B may cause the characteristic of antenna 8 to deteriorate but increasing core 11 in length makes it possible to obtain sufficient performance even when region B is reduced in size. Even when the size of region B is fixed and the number of turns is constant, the characteristic of antenna 8 can be changed by changing the lengths of regions A and C. That is, setting at least one of regions A and C to be longer makes it possible to improve the characteristic of antenna 8.

Figure 5:
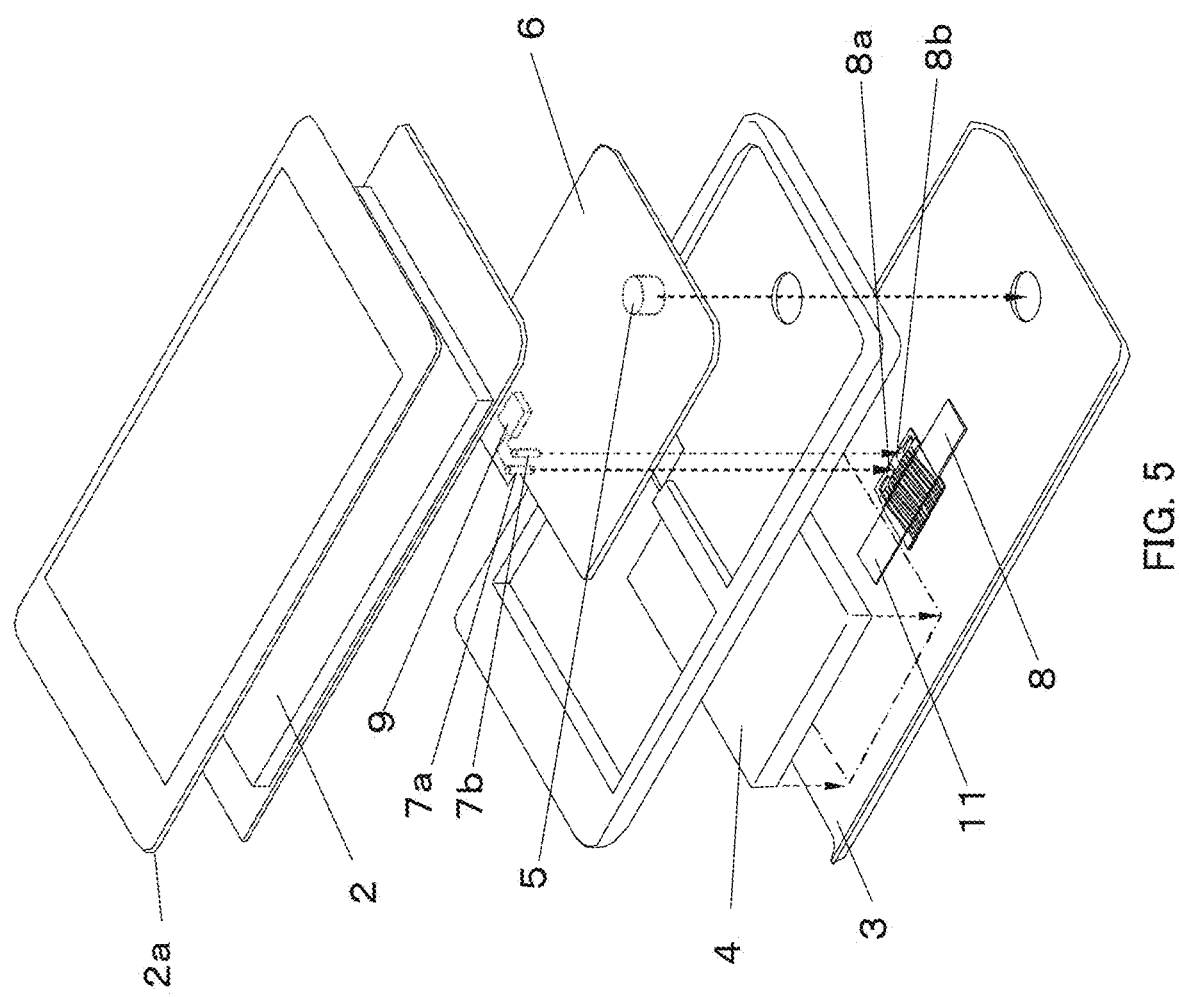
FIG. 5 is an exploded perspective view of a portable terminal in which the antenna according to Embodiment 1 is mounted.
Figure 6:
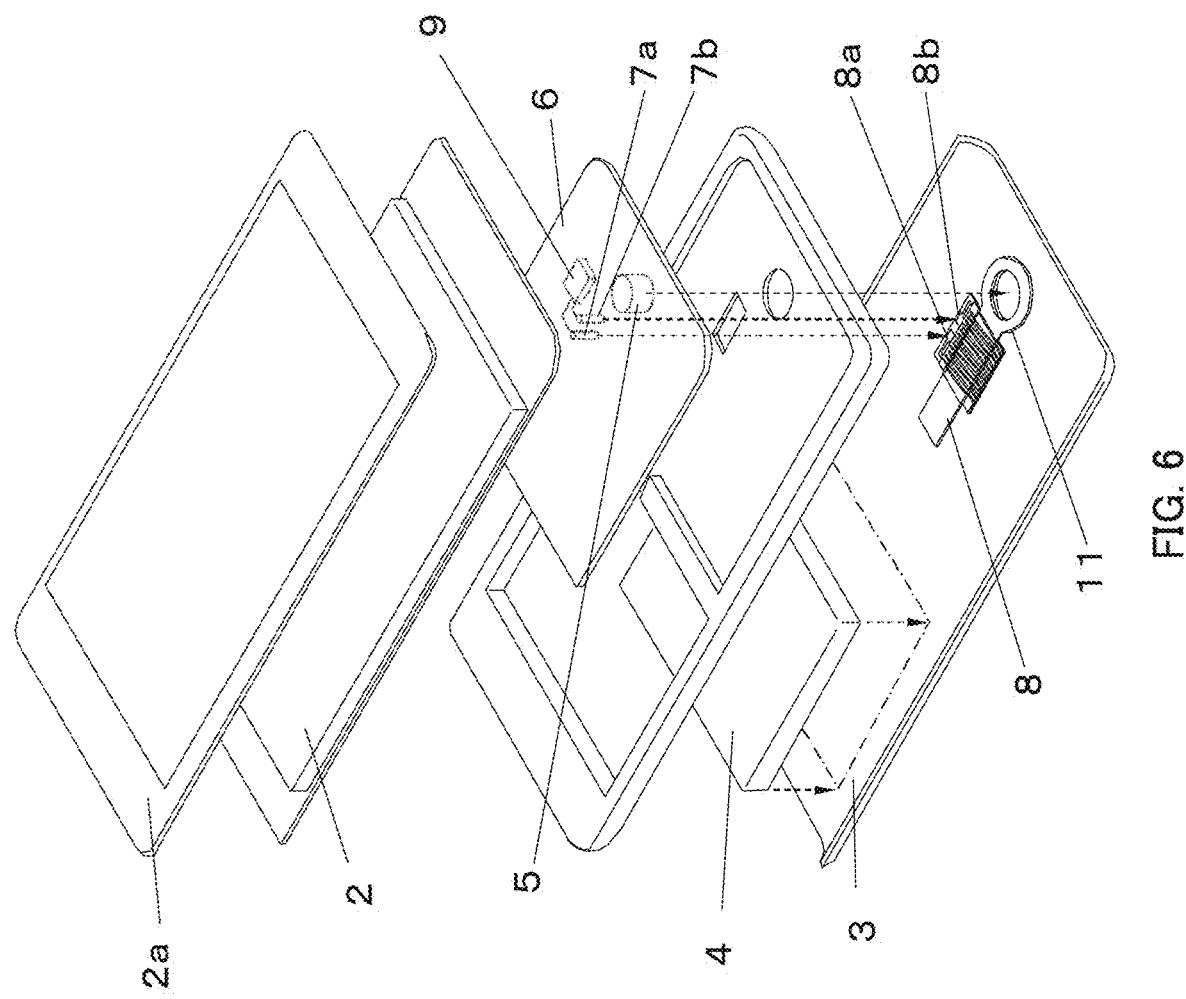
FIG. 6 is an exploded perspective view of a portable terminal in which the antenna according to Embodiment 1 is mounted.

Next, a description will be given of an arrangement and a shape of antenna 8 in portable terminal 1 which are different from those shown in FIG. 1. FIG. 5 is an exploded perspective view of a portable terminal in which the antenna according to Embodiment 1 is mounted. FIG. 6 is another exploded perspective view of a portable terminal in which the antenna according to Embodiment 1 is mounted. However, antennas 8 in FIG. 5 and FIG. 6 are basically similar to antenna 8 in FIG. 1 and are substantially identical though there are certain differences in the characteristics and effects.

Figure 10:
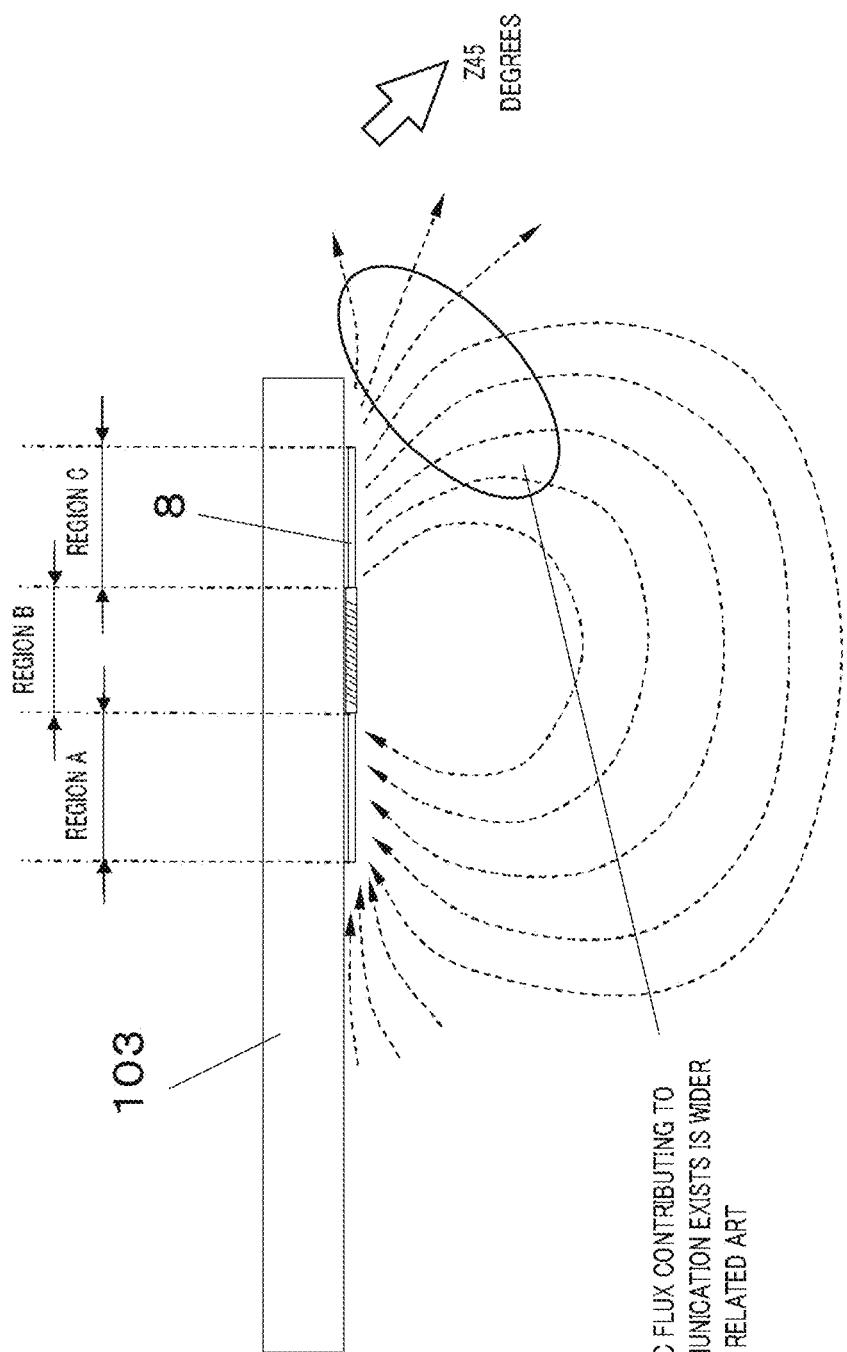
FIG. 10 is a diagram illustrating a magnetic field generated by the antenna according to Embodiment 1.

In FIG. 5, part of core 11 of antenna 8 (portion corresponding to region A or region C in FIG. 2) overlaps battery 4 unlike FIG. 1. In this way, even when antenna 8 is arranged substantially at the center of back cover 3, it can perform communication with a high characteristic. That is, in view of the communication characteristic of antenna 8, it does not matter at which region of back cover 3, antenna 8 is disposed. However, locating antenna 8 at an end leads to a reduction in the number of various components (parts including a metal in particular) in the periphery of antenna 8 in the case located and makes antenna 8 less susceptible to the influence of the components. In addition, communication in a diagonal direction is carried out favorably as shown in FIG. 10 which will be described later. The thickness of core 11 need not be uniform. The portion of core 11 where antenna 8 overlaps battery 4 may be made thinner or the portions of core 11 where antenna 8 overlaps other components may also be made thinner. The thickness of core 11 may be changed so as to make core 11 easily mountable in the case. Note that even when antenna 8 is disposed at the center, communication in a diagonal direction is possible, but the shape of portable terminal 1 makes communication in the diagonal direction more difficult, so that it is preferable to dispose antenna 8 at an end portion. Moreover, in FIG. 6, a through hole is provided in part of core 11 (portion corresponding to region A or region C in FIG. 2). The through hole overlaps a through hole provided in back cover 3 and camera 5 is inserted in the through hole. That is, core 11 is disposed so as to surround camera 5. This can reduce adverse effects of the camera (metal body). This is because a magnetic flux passes through core 11, making it difficult for the magnetic flux to reach the camera.

Next, the reason that antenna 8 of Embodiment 1 has a favorable characteristic will be described. To make the description easier to understand, the antenna will be described in comparison with a conventional antenna in FIG. 7.

Figure 7:
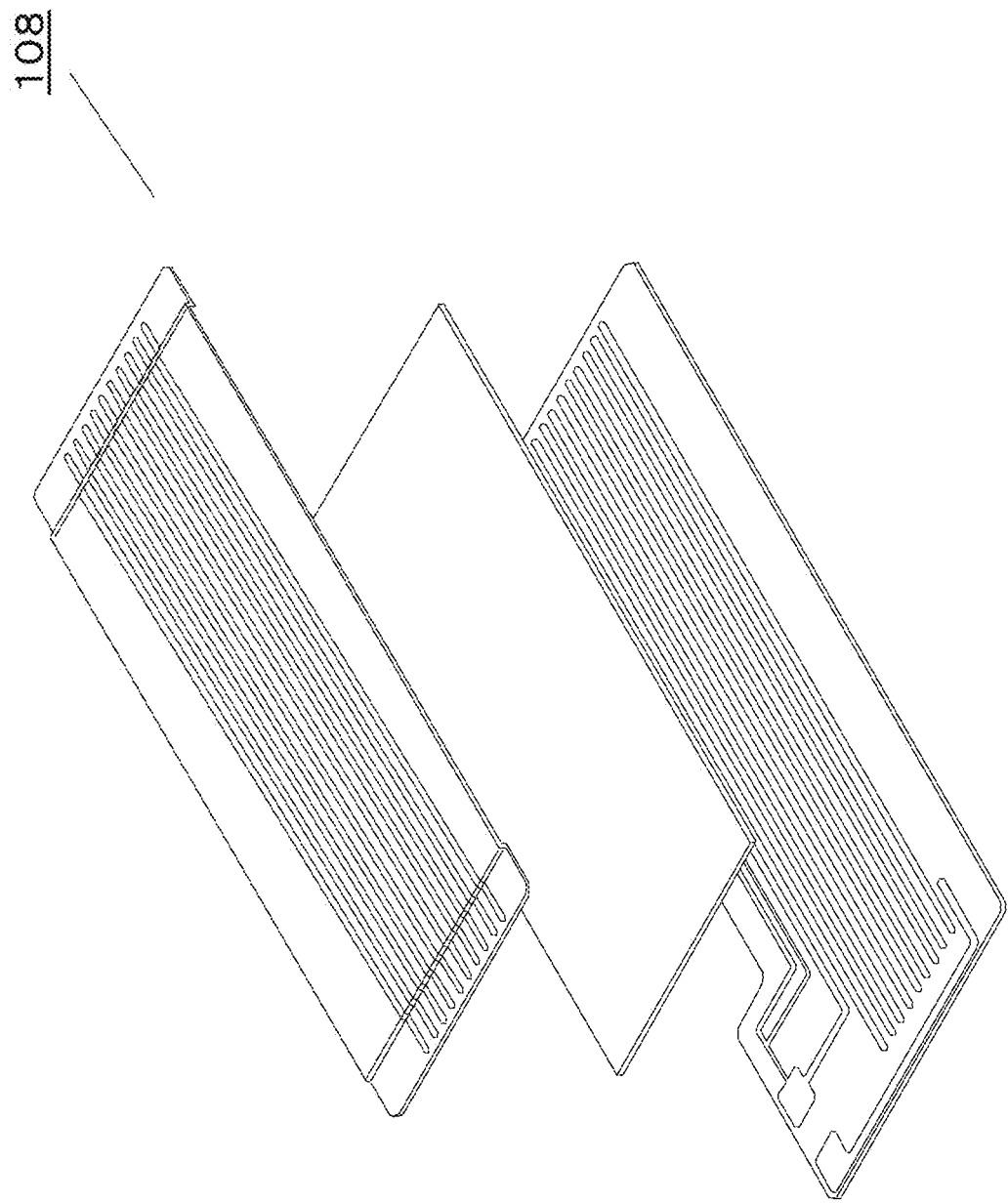
FIG. 7 is a diagram illustrating an example of a conventional antenna.
Figure 8:
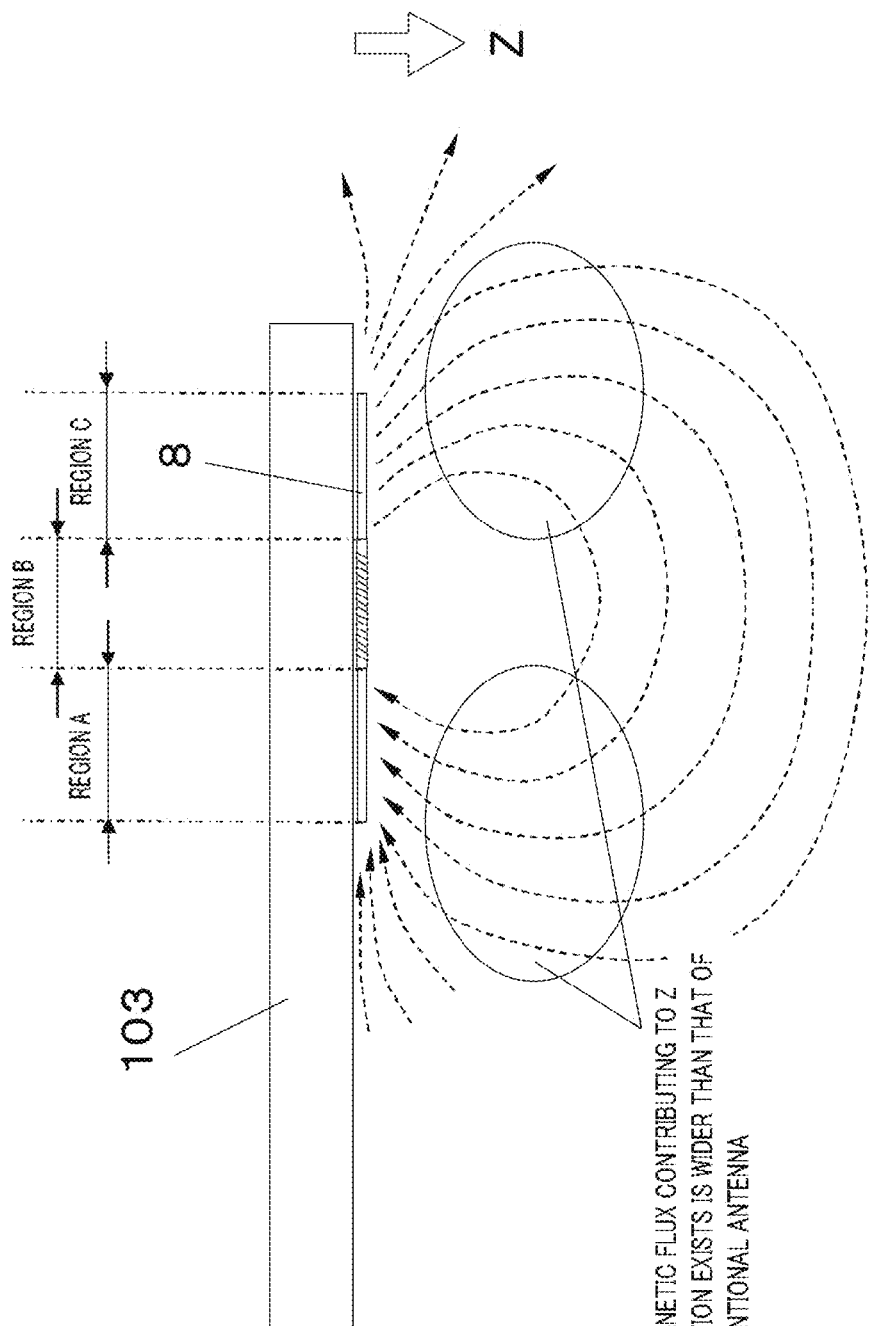
FIG. 8 is a diagram illustrating a magnetic field generated by the antenna according to Embodiment 1.
Figure 9:
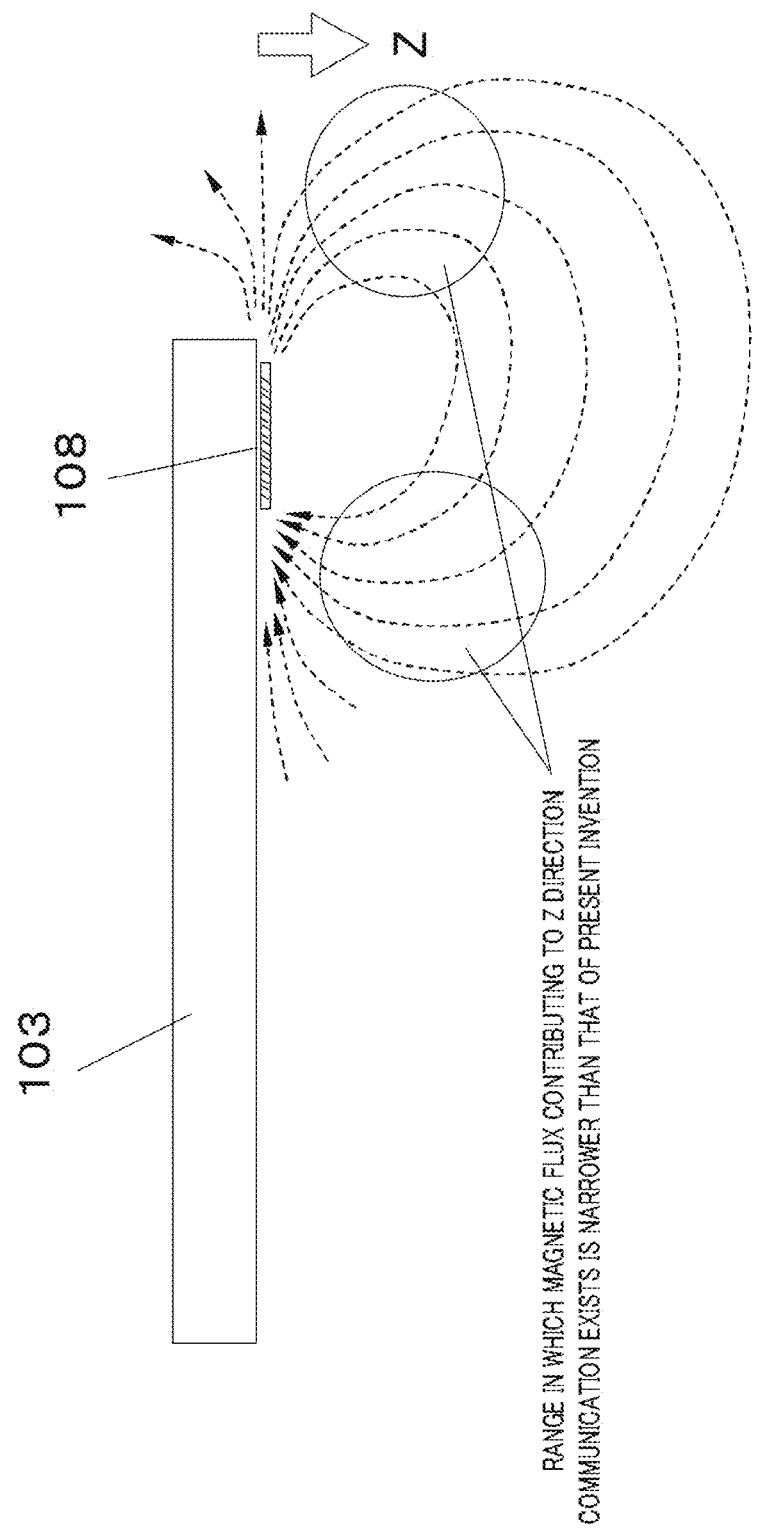
FIG. 9 is a diagram illustrating the magnetic field generated by the antenna in FIG. 7.
Figure 11:
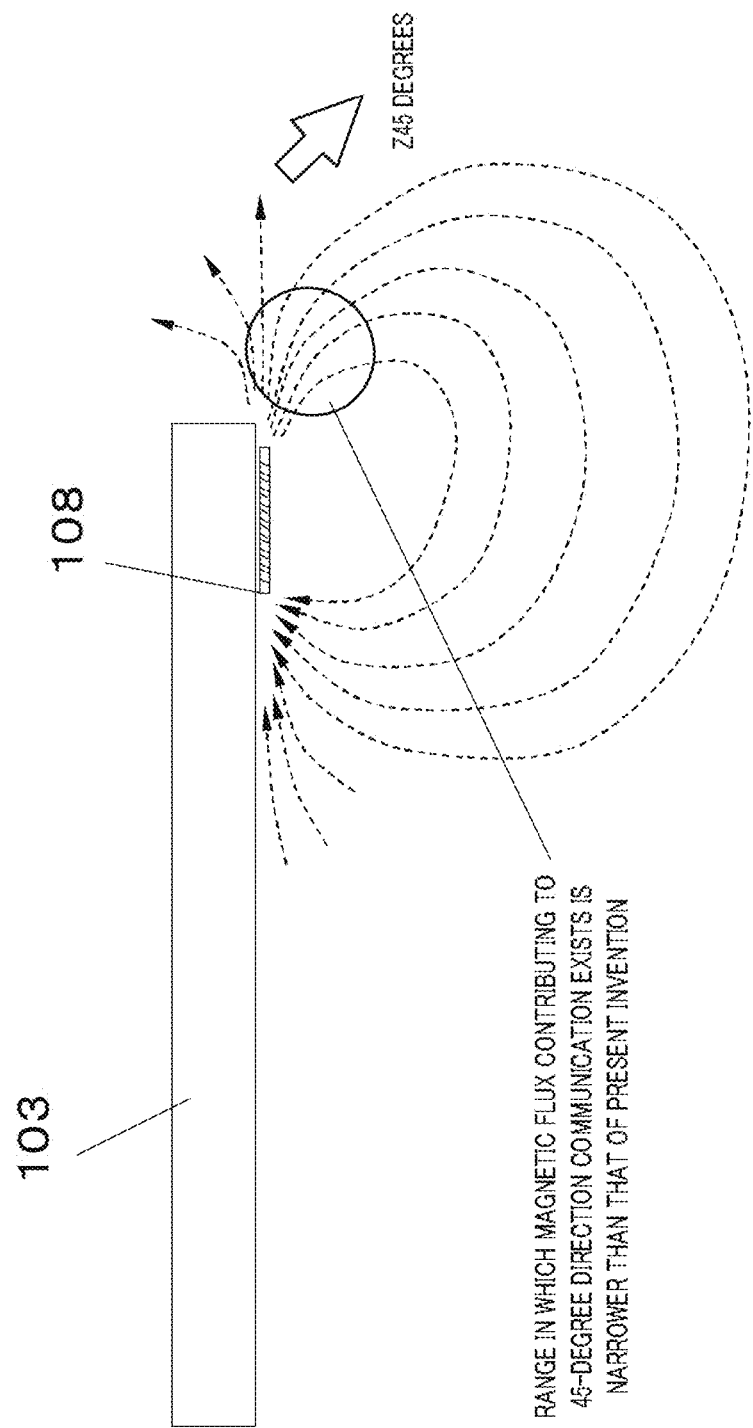
FIG. 11 is a diagram illustrating the magnetic field generated by the antenna in FIG. 7.

FIG. 7 is a diagram illustrating an example of a conventional antenna. FIG. 8 is a diagram illustrating a magnetic field generated by the antenna according to Embodiment 1. FIG. 9 is a diagram illustrating the magnetic field generated by the antenna in FIG. 7. FIG. 10 is a diagram illustrating a magnetic field generated by the antenna according to Embodiment 1. FIG. 11 is a diagram illustrating the magnetic field generated by the antenna in FIG. 7. FIGS. 12A to 12D are diagrams illustrating a communicable distance of the antenna according to Embodiment 1 and the antenna in FIG. 7 when the antennas are placed opposite to each other in parallel. FIGS. 13A to 13D are diagrams illustrating a communicable distance of the antenna according to Embodiment 1 and the antenna in FIG. 7 when the antennas are placed opposite to each other at an angle of 45 degrees. In FIG. 8 to FIG. 13, antenna 8 and antenna 108 are placed on metal body 103, and this metal body 103 is intended to take into consideration the influence of the metal body in portable terminal 1.

One of the differences between antenna 8 of Embodiment 1 shown in FIG. 2 and conventional antenna 108 shown in FIG. 7 is a difference in size of regions A and C. Although region A and region C barely exist in conventional antenna 108 in FIG. 7, region A and region C exist in antenna 8 of Embodiment 1, protruding from flexible substrate 12. Region A and region C function like the opening of the coil, thus serving as an entrance and an exit of a magnetic flux generated. That is, as shown in FIG. 8, a magnetic flux enters core 11 through region A as a large entrance, passing through a space positioned between flexible substrates 12 and goes out of core 11 through region C as a large exit.

Note that in conventional antenna 108, the flexible substrate has an area of 12.5 mm×46 mm with respect to the size of the core of 12 mm×42 mm×0.3 mm. On the other hand, in antenna 8 of Embodiment 1, flexible substrate 12 has an area of 20 mm×16 mm with respect to the size of core 11 of 40 mm×10 mm×0.3 mm. Thus, with regard to the core and flexible substrate (that is, the size of the coil), antenna 8 of Embodiment 1 is smaller than conventional antenna 108. That is, when an antenna is formed in the same mode as that of the conventional antenna in the size of Embodiment 1, it is obvious that characteristics such as the size of the communicable region, communication distance or the like deteriorates in antenna 8 of Embodiment 1 compared to conventional antenna 108.

However, of the magnetic flux generated by antenna 8 of Embodiment 1 (magnetic flux used for communication), the area of the component in the Z direction (vertical direction) in FIG. 8 increases. On the other hand, in conventional antenna 108 in FIG. 9, since the opening area is small, the magnetic flux is concentrated on a small opening, the area of the component of the magnetic flux in the Z direction used for communication decreases. Thus, even when the conventional antenna (general antenna) has an opening area in the axis direction of the coil, it is difficult to have an opening area in other than the axis direction of the coil. As a result, when the communicable region is concentrated to one side and when the position of the antenna is deviated even slightly from the communicable region, communication becomes difficult immediately. The region where communication becomes difficult is a region where, of the magnetic flux generated by one antenna, both the magnetic flux directed from the one antenna to the other antenna and the magnetic flux directed from the other antenna to the one antenna penetrate the other antenna, thus causing the magnetic flux generated by the one antenna to be canceled out. Since conventional antenna 108 has a small opening area of the coil, conventional antenna 108 is more likely to fall into a situation where magnetic fluxes cancel out each other. On the other hand, since antenna 8 of Embodiment 1 has a large opening area of the coil, magnetic fluxes in both directions hardly penetrate the counterpart antenna. Moreover, as described above, in conventional antenna 108 and other antennas, the entrance and exit of magnetic fluxes are generally oriented toward the axis direction of the coil. Therefore, the main communication direction is basically the axis direction of the coil and it is difficult to perform communication in directions other than the main communication direction. In contrast, with antenna 8, core 11 has a plate-like shape, and the two large surfaces thereof are oriented toward the Z direction in FIG. 8 and not oriented toward the axis direction of the coil of antenna 8. Moreover, since the surface in which the entrance and exit of the magnetic flux are formed in a direction (Z direction) other than the axis direction of the coil, it is possible to perform favorable communication also in the direction (Z direction) other than the axis direction of the coil. Since antenna 8 can naturally perform communication even in the axis direction of the coil, it is possible to extend the communicable region three-dimensionally from the axis direction of the coil to the direction in which the surface of core 11 is oriented.

It is likewise clear from FIG. 10 and FIG. 11 that a magnetic flux in a Z45-degree direction also extends over a wide range in antenna 8 of the portable device of the present embodiment in FIG. 10. This is because, since region C has a large area, it is possible to obtain the same effect as that obtained when the opening area of antenna 8 is large. On the other hand, since conventional antenna 108 in FIG. 11 has a small opening area, a magnetic flux is concentrated on a small opening, and the area of the component in the Z45-degree direction of the magnetic flux used for communication is reduced. As a result, the communicable region is concentrated to one side in antenna 108 and when the position of the antenna is deviated even slightly from the communicable region, communication becomes difficult immediately.

These results are shown in FIGS. 12A to 12D and FIGS. 13A to 13D.

Under a situation shown in FIGS. 12A and 12B, the results of an experiment as shown in FIGS. 12C and 12D are obtained. That is, FIG. 12A is a side view in a case where a communication target antenna performs communication in parallel with antenna 8 or antenna 108 and a positional relationship thereof is coordinates (0, 0). The communication distance referred to here is a distance from the surface of an antenna which is a communication counterpart to the surface of antenna 8. FIG. 12B is a top view of FIG. 12A. FIG. 12C is a diagram showing communicable distances of antenna 8 of Embodiment 1 by coordinate. FIG. 12D is a diagram showing communicable distances of conventional antenna 108 listed by coordinate. Note that coordinates (0, 0) mean a point at which the central point on the short side at an end of metal body 103 (upper side in FIGS. 12B and 13B) matches the central point of a card of the communication counterpart (80 mm×50 mm) in the arrangements of metal body 103 and antennas 8 and 108 in FIG. 8 to FIG. 11. In FIGS. 13A to 13D, the short side at an end of metal body 103 means the short side of the surface on the side on which antennas 8 and 108 are placed.

As shown in FIG. 12C, antenna 8 of Embodiment 1 has less concentration in the communication distances listed by coordinates and can stably perform communication over a wide range. Furthermore, the communication distances are extended in almost all regions. On the other hand, conventional antenna 108 involves considerable variations in the communication distances and communication is considerably difficult at a position of Y=0 mm in particular. Since there is a region in the middle of the communication region where communication is difficult, it is particularly difficult to stably perform communication.

Under a situation shown in FIGS. 13A and 13B, the results of an experiment as shown in FIGS. 13C and 13D are obtained. That is, FIG. 13A is a side view of a case where a communication target antenna performs communication opposite to antenna 8 or antenna 108 at a diagonal angle of 45 degrees and the positional relationship is coordinates (0, 0). FIG. 13B is a top view of FIG. 13A. FIG. 13C is a diagram showing the communicable distances of antenna 8 of Embodiment 1 listed by coordinates. FIG. 13D is a diagram showing the communicable distances of conventional antenna 108 listed by coordinates.

As shown in FIG. 13C, antenna 8 of Embodiment 1 has less deviation in the communication distances listed by coordinate and can stably perform communication over a wide range. On the other hand, conventional antenna 108 involves considerable variations in the communication distances and communication is considerably difficult at a position of Y=15 mm in particular. Naturally, communication in the axis direction of the coil can be carried out favorably.

From the results mentioned above, antenna 8 of Embodiment 1 can stably perform communication over a wide range compared to conventional antenna 108 in FIG. 7, even when antennas communicating with each other are placed opposite to each other in parallel or opposite to each other diagonally. This is because since the areas of region A and region C in FIG. 2 has increased, the region in which the magnetic field spreads has increased. That is, when antenna 8 communicates with the other antenna, a magnetic flux directed from the antenna 8 side to the other antenna side and a magnetic flux directed from the other antenna side to the antenna 8 side are generated. When the magnetic fluxes in both directions penetrate the other antennas, the magnetic fluxes in mutual directions cancel out each other, making it impossible to communicate with each other. When the opening area of the coil is narrow as in the case of conventional antenna 108, the magnetic flux is concentrated on the narrow opening area, so that the area in which the magnetic flux in one direction spreads is small. As a result, the magnetic fluxes in both directions are likely to penetrate the antenna having an area corresponding in size to a card (approximately 80 mm×approximately 50 mm) (because a direction other than the axis direction of the coil is a communication direction thereof and the magnetic fluxes in both directions are located nearby). On the other hand, in the case of antenna 8 of Embodiment 1, the area in which a magnetic flux in one direction spreads is large, so that the magnetic fluxes in both directions are less likely to penetrate the antenna having an area corresponding in size to a card. In other words, since a magnetic flux in one direction can penetrate most part of the antenna having an area corresponding in size to a card, communication is less likely to become difficult. Furthermore, it is clear that, in the case of antenna 8 of Embodiment 1, the area of flexible substrate 12 becomes considerably small while the size of core 11 is suppressed to the same level compared to conventional antenna 108. Furthermore, since the thicker part (region B) of antenna 8 is reduced in size while the thinner part (regions A and C) is used, it is possible to achieve a thin and small antenna compared to conventional antenna 108. Nevertheless, antenna 8 of Embodiment 1 can maintain a communication distance equal to or greater than conventional antenna 108 and stably perform communication over a wide range.

Furthermore, another feature of the antenna according to Embodiment 1 is the ability to improve the communication characteristic in a direction different from the axis direction of the coil making up flexible substrate 12, as a communication direction. That is, according to FIG. 8, the axis direction of the coil of antenna 8 is a lateral direction and communication is possible in the lateral direction. For a general antenna, the axis direction of the coil is more likely to be a main communication direction, for example. However, antenna 8 of Embodiment 1 adopts plate-like core 11, and one of the two surfaces provided for core 11 is oriented toward back cover 3, whereas the other is oriented downward in FIG. 8 which is the main communication direction.

Setting region A and region C oriented downward to have sufficient areas allows antenna 8 to use a wide area in the Z direction in FIG. 8 as the communication direction although this direction is not the axis direction of the coil.

Figure 14:
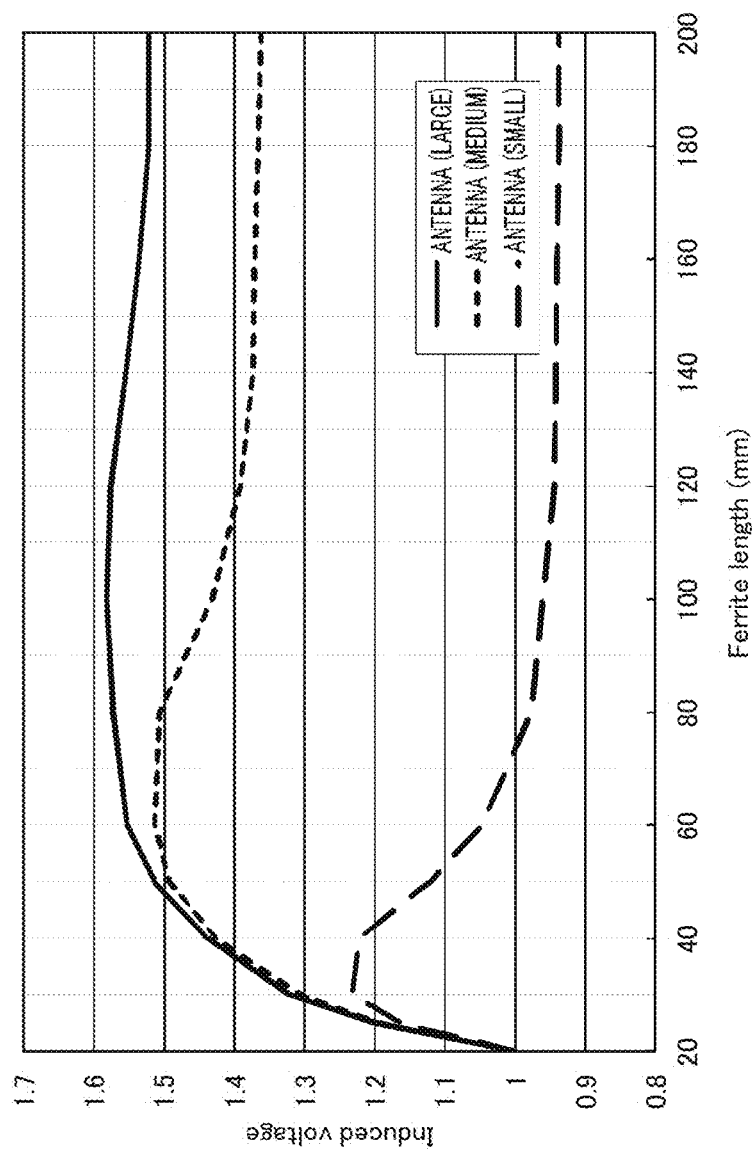
FIG. 14 is a diagram illustrating a relationship between the size of the core of the antenna according to Embodiment 1 and an induced voltage of the antenna.

Next, the size of core 11 will be described. FIG. 14 is a diagram illustrating a relationship between the size of the core of the antenna according to Embodiment 1 and an induced voltage of the antenna.

In FIG. 14, core 11 has a width of 10 mm, the coil has a length of 20 mm (in the longitudinal direction of core 11), and the width of core 11 in the longitudinal direction is changed with the coil kept disposed at the center of core 11 in the longitudinal direction. In the respective cases where the sizes of the antenna of the communication counterpart is large, medium, and small in the situation shown in FIG. 12A, a maximum voltage induced in each case is measured. The sizes of the respective antennas are: antenna (large) having 70 mm×40 mm, antenna (medium) having 45 mm×30 mm, and antenna (small) having 25 mm×20 mm. The values on the vertical axis in FIG. 14 are plotted after being normalized by the respective induced voltages when the length of core 11 is 20 mm.

When the length of core 11 is 30 to 40 mm (equal to or greater than 1.5 times but not greater than two times the length of the coil), the values of maximum induced voltages of antenna (large), antenna (medium) and antenna (small) are greater by 20% or more of the length of core 11 which is 20 mm, and antennas 8 can stably perform favorable communication with the communication counterparts provided with antennas in a variety of sizes. When the length of core 11 is 40 to 70 mm (equal to or greater than 2 times but not greater than 3.5 times the length of the coil), it is possible to maintain the maximum induced voltages of the antenna (large) and antenna (medium) at a high level and at the same time improve the maximum induced voltage of the antenna (small) compared to the case where the length of the core is 20 mm. When the length of core 11 exceeds 120 mm, the maximum induced voltage does nothing but decreases irrespective of the size of the antenna of the communication counterpart. Therefore, the length of core 11 is preferably equal to or less than 120 mm at longest.

Furthermore, even when mounted in an electronic device that performs communication in a plurality of frequency bands, antenna 8 of Embodiment 1 is advantageous over conventional antenna 108.

Figure 15:
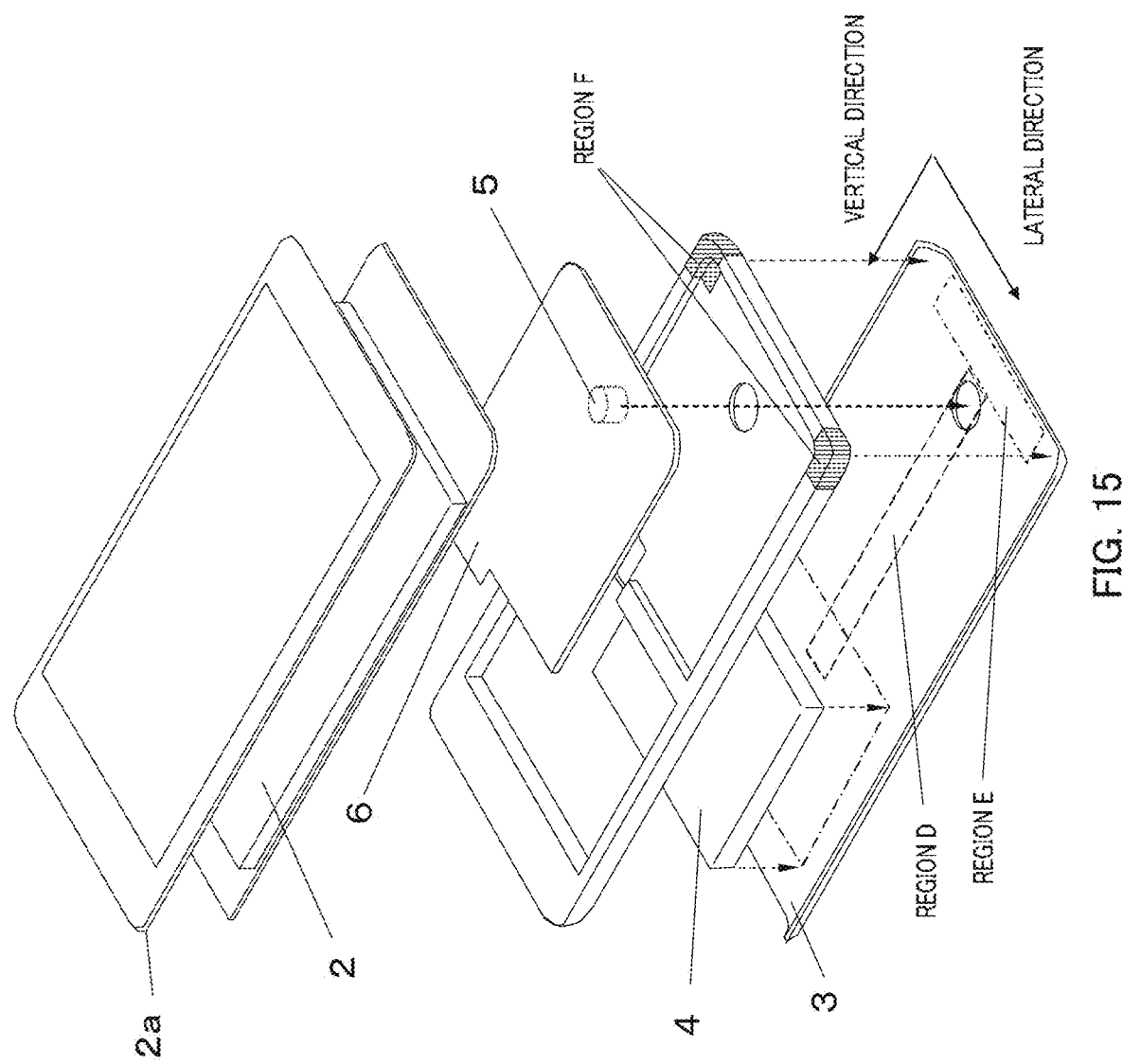
FIG. 15 is a diagram illustrating an arrangement of the antenna according to Embodiment 1, a conventional antenna, and another antenna having a different frequency band in an electronic device.

FIG. 15 is a diagram illustrating an arrangement of the antenna according to Embodiment 1 of the present invention, a conventional antenna and an antenna in another frequency band in an electronic device. Region D represents a recommended mounting position of an antenna, region E represents a recommended mounting position of a conventional antenna and region F represents a position of an antenna for a frequency band of GPS, Bluetooth (registered trademark), WLAN or the like.

An antenna for a frequency band of GPS, Bluetooth (registered trademark), WLAN or the like is generally disposed at an end of a case of an electronic device. This is intended to reduce the influence of other parts such as a metal body in the case. Since an antenna or the like for a normal telephone is disposed at a lower end portion on the battery 4 side, an antenna for a frequency band such as GPS, Bluetooth (registered trademark), WLAN is disposed at positions closer to the upper end portion on the side apart from battery 4. For an antenna for a frequency band of GPS, Bluetooth (registered trademark), WLAN or the like, a magnetic body such as a magnetic sheet or core provided for most of antennas for a frequency band of NFC constitutes a root of adverse effects. That is, when the antenna for a frequency band of GPS, Bluetooth (registered trademark), WLAN or the like operates, an eddy current is generated in the magnetic body of the antenna for a frequency band of NFC, interfering with communication of other antennas. Therefore, the antenna for a frequency band of NFC, the antenna for a frequency band of GPS, Bluetooth (registered trademark), WLAN or the like are preferably disposed apart from each other. However, when the ease of use for the user is taken into consideration, if the longitudinal direction of portable terminal 1 is not identical to the axis direction of the coil of antenna 108, the communication direction becomes inconvenient. As a result, since conventional antenna 108 in FIG. 7 has the lateral direction in FIG. 15 as a longitudinal direction and has the axis direction of the coil as a widthwise direction, both ends of antenna 108 in the longitudinal direction extend to the vicinity of the end portion of back cover 3, so that it is difficult to place it on the center side of back cover 3 apart from the end portion of back cover 3. Moreover, even when a planar loop antenna is used, the opening area has to be large to secure the communication characteristic, and the antenna ends up reaching the vicinity of the end portion of back cover 3.

However, with the antenna according to Embodiment 1, even when the longitudinal direction of back cover 3 is identical to the axis direction of the coil of antenna 8, since the longitudinal direction of antenna 8 is substantially identical to the longitudinal direction of back cover 3, the antenna can be disposed apart from the end portion of back cover 3.

Figure 16:
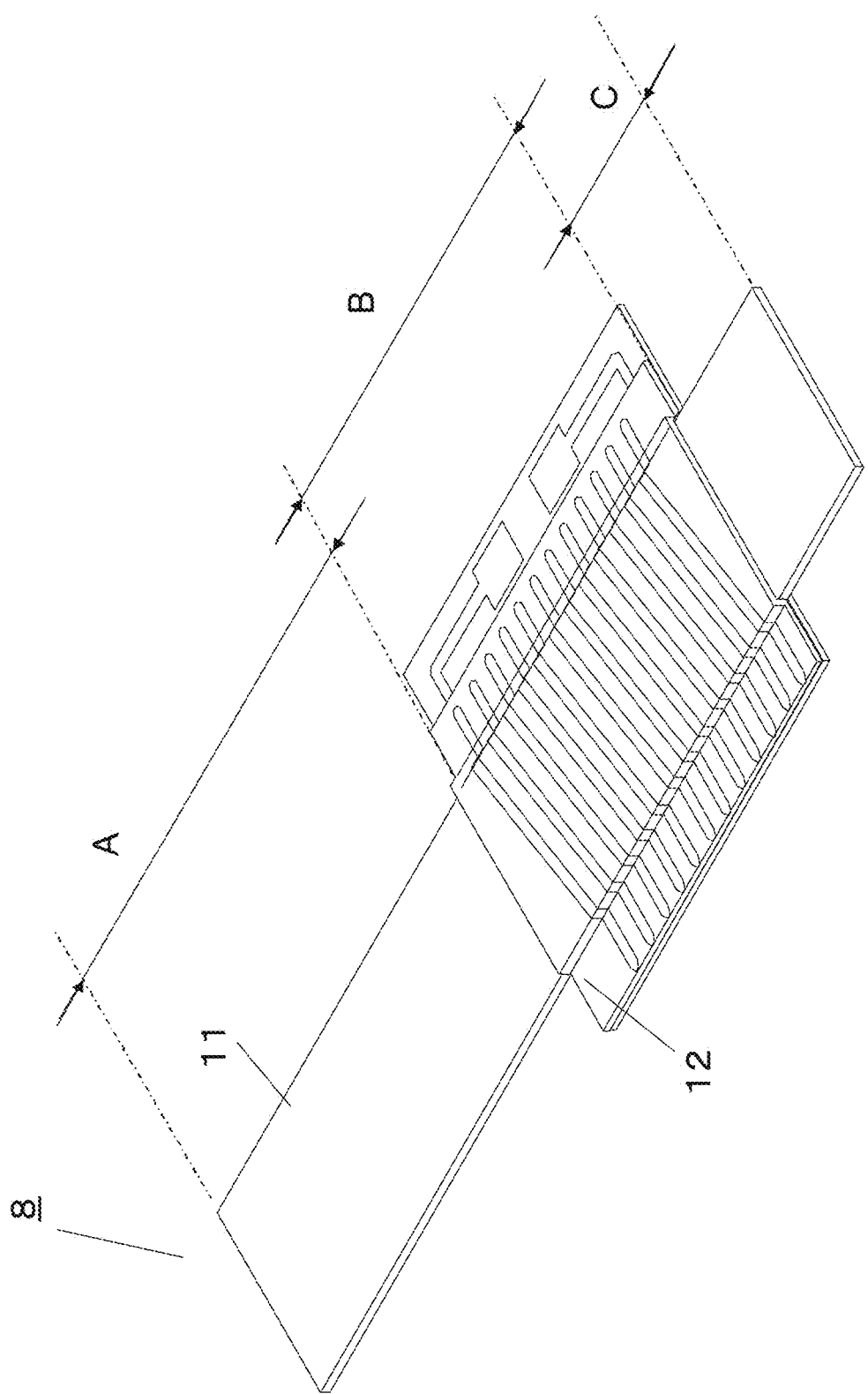
FIG. 16 is a perspective view of the antenna according to Embodiment 1.

Next, antenna 8 according to Embodiment 1 which has a shape different from that of FIG. 2 will be presented. FIG. 16 is a perspective view of an antenna having a different shape included in Embodiment 1 and the length ratio or difference in length between region A and region C is large. In this way, region A and region C may be different in length and area. The case illustrated in FIG. 16 is equivalent to a state in which the opening of the coil pattern of antenna 8 is wide on the region A side and narrow on the region C side. Therefore, it is possible to perform communication over a wide range in the vicinity of region A since the area in which magnetic fluxes in the Z direction and Z45-degree direction in FIG. 8 and FIG. 10 respectively are generated increases there.

Figure 17:
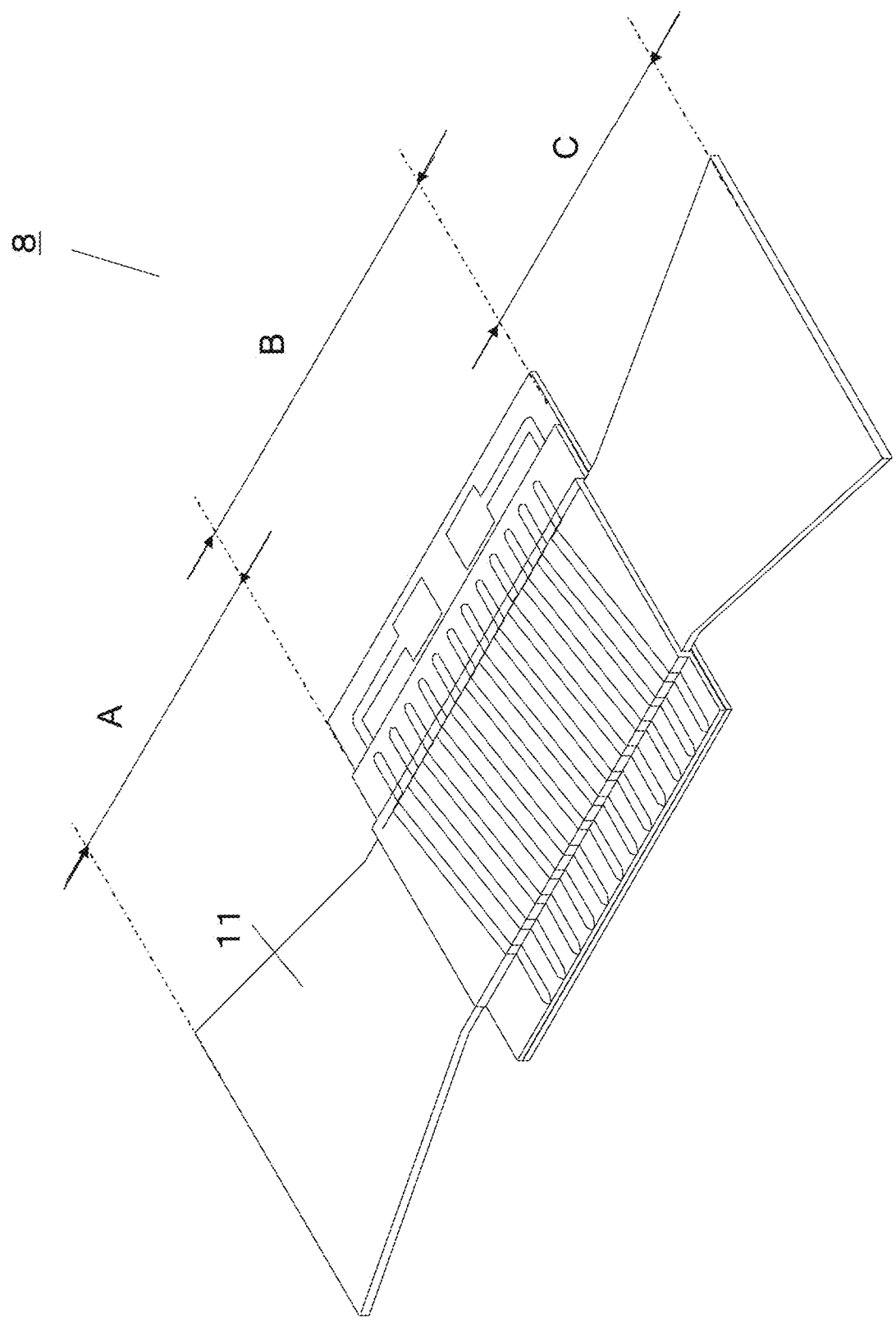
FIG. 17 is a perspective view of the antenna according to Embodiment 1.

FIG. 17 is a perspective view of an antenna having a different shape which is included in Embodiment 1 and the shape of core 11 is not rectangular. That is, the width in the winding direction (direction perpendicular to the coil axis direction) of the coil pattern of core 11 increases from the region B side outward. Therefore, the areas of region A and region C are large compared to a rectangular core having the same width as region B. As a result, the communicable distance can be increased by increasing the influence of core 11 without increasing the area of flexible substrate 12.

Next, an antenna apparatus will be described, which includes antenna 8 described so far and a metal body. Here, a description will be particularly given of a case where back cover 3 is, for example, a metal body. That is, this is a case where it is preferred to generate a magnetic field penetrating the metal body to the depth when seen from antenna 8, and the metal body is not limited to back cover 3. In this case, the antenna apparatus includes antenna 8 and a back cover (metal body), back cover 3 is provided with slot 41, and at least part of the coil winding part (region B) and no-coil winding part (regions A and C) faces slot 41. The length of slot 41 in the axis direction of the coil of antenna 8 is preferably equal to or greater than the length of antenna 8.

The length of slot 41 in the winding direction of the coil is equal to or less than the length of the antenna.

When the metal body is located near antenna 8, an eddy current that cancels out the magnetic flux of antenna 8 is generated in the metal body. Since the eddy current flowing through the metal body weakens the magnetic flux generated in antenna 8, it becomes considerably difficult for antenna 8 to communicate with a communication counterpart at the back across the metal body. However, antenna 8 of the present embodiment enables communication by only providing one slot in the metal body. The principles of communication will be described later.

Figure 18:
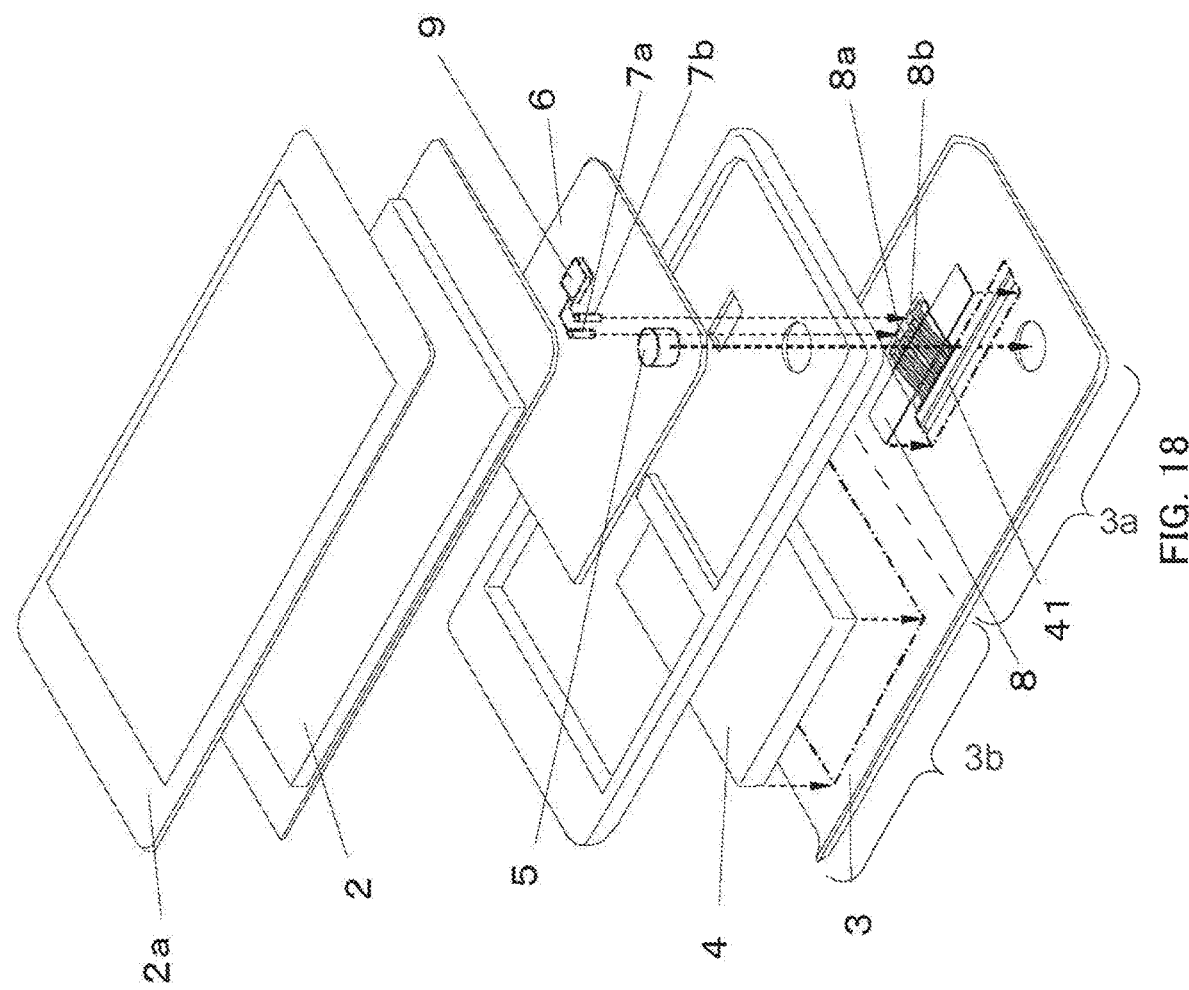
FIG. 18 is an exploded perspective view of a portable terminal including a metal body in which the antenna according to Embodiment 1 is mounted.
Figure 19:
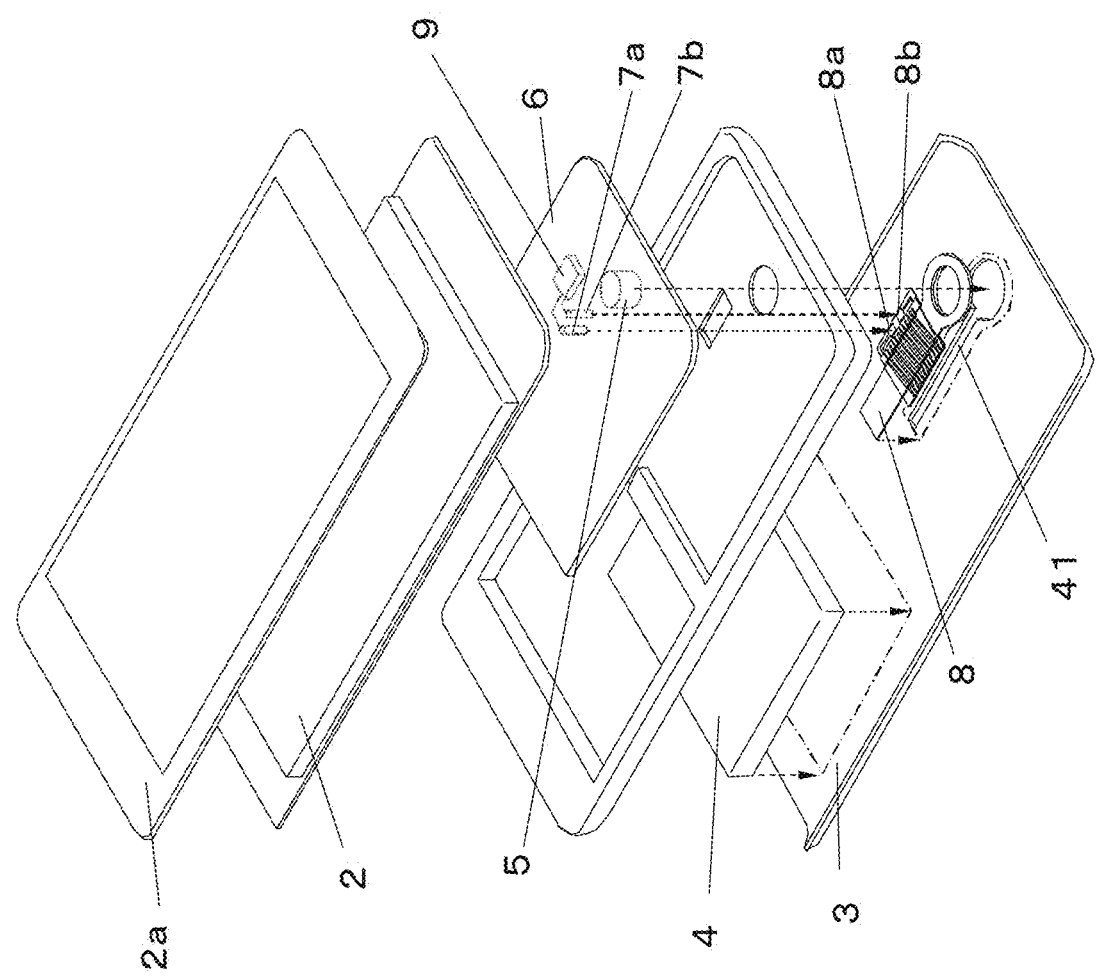
FIG. 19 is an exploded perspective view of a portable terminal including a metal body in which the antenna according to Embodiment 1 is mounted.

FIG. 18 is an exploded perspective view of a portable terminal including a metal body in which the antenna according to Embodiment 1 is mounted. Here, back cover 3 is the metal body. FIG. 19 is an exploded perspective view of the portable terminal including the metal body in which the antenna according to Embodiment 1 is mounted. FIG. 19 is different from FIG. 18 in that slot 41 provided in back cover 3 is connected to a through hole for a camera. Core 11 also has a shape that surrounds the camera.

Unlike FIG. 1, slot 41 is formed in back cover 3 in FIG. 18. This slot 41 faces antenna 8 and antenna 8 is located on or above slot 41 in contact or not in contact therewith. That is, there is such an arrangement relationship that when portable terminal 1 is seen from the outside of back cover 3, antenna 8 is seen through slot 41. The longitudinal direction of slot 41, the coil axis direction of antenna 8 and the longitudinal direction of core 11 are parallel to one another. However, while it is preferable that all these three directions be parallel to one another, even if these three directions are deviated from one another by approximately 30 degrees, favorable effects can still be obtained.

In Embodiment 1, slot 41 has a length of 40 mm and a width of 4 mm. Note that antenna 8 has a length of 40 mm and a width of 10 mm. Slot 41 has the same length as that of antenna 8, but without being limited to this, basically, the longer the better, and slot 41 is preferably longer than antenna 8. This is because the longer slot 41, the greater the loop of an eddy current flowing through back cover 3 becomes, and a larger magnetic field is formed. When slot 41 is longer than core 11, the magnetic field actually formed is larger than the magnetic field originally formed by core 11. Slot 41 is at least longer than flexible substrate 12 (region B) and region A and region C of core 11 overlap at least part of slot 41. Furthermore, the width of slot 41 is smaller than the width of core 11. Originally, the greater the width of slot 41, the better, but when the width of slot 41 is smaller than the width of core 11, it is possible to achieve miniaturization of slot 41 and an eddy current smoothly flows through back cover 3. In addition, since slot 41 need not be connected to the end portion of back cover 3, slot 41 can be freely disposed at any position of back cover 3.

Next, a description will be given of the reason why provision of slot 41 enables communication of antenna 8 even when back cover 3 is a metal body. Note that the metal body is not limited to back cover 3, and the metal body may be any metal body mounted on portable terminal 1 or the like, and back cover 3 will be described as an example.

Figure 20A:
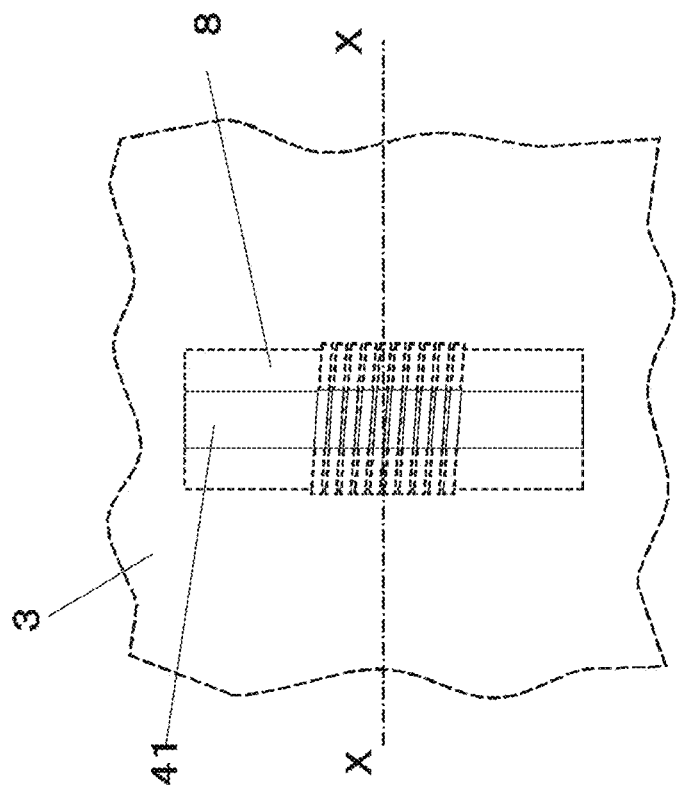
FIGS. 20A and 20B are diagrams illustrating a relationship between a back cover, a slot and the antenna according to Embodiment 1.
Figure 20B:
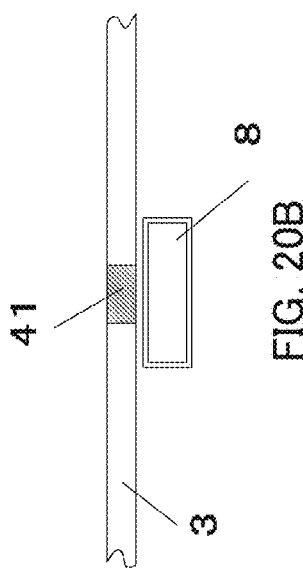
Figure 22:
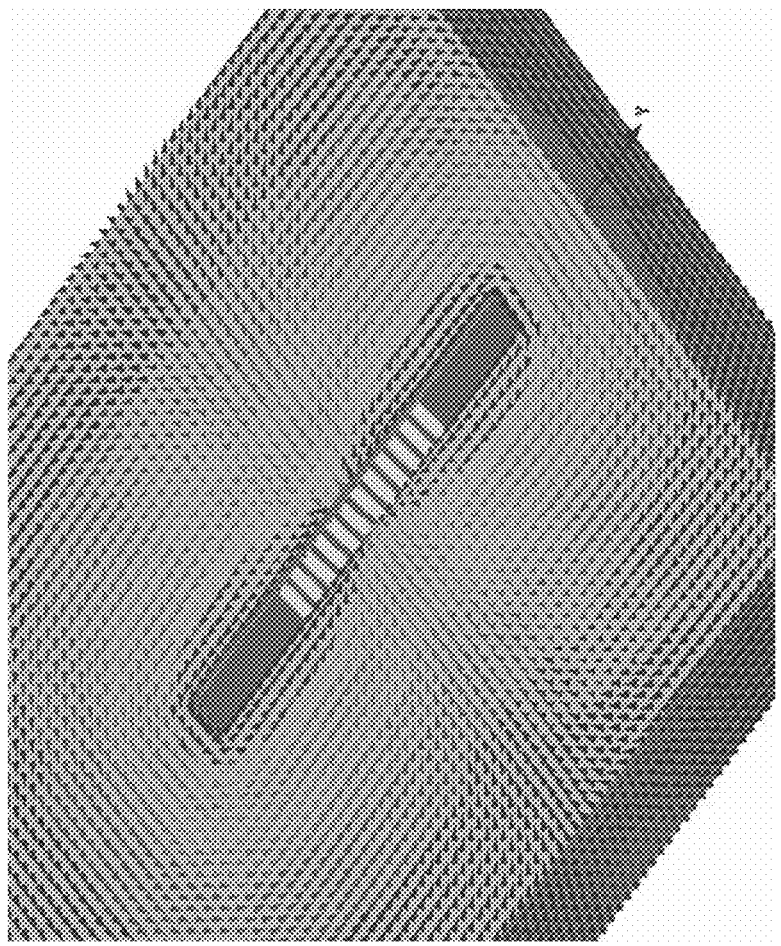
FIG. 22 is a diagram illustrating a current flowing through the back cover (metal body) according to Embodiment 1.

FIGS. 20A and 20B are diagrams illustrating a relationship between the back cover, the slot and the antenna according to Embodiment 1. FIG. 20A is a top view and FIG. 20B is a cross-sectional view along straight line X-X of FIG. 20A. FIGS. 21A to 21C are diagrams illustrating a relationship between the magnetic flux generated by the antenna according to Embodiment 1, the back cover and the slot. FIG. 21A is a top view, FIG. 21B is a cross-sectional view along straight line Y-Y of FIG. 21A, and FIG. 21C is a cross-sectional view along straight line Z-Z of FIG. 21A. FIG. 22 is a diagram illustrating a current flowing through the back cover (metal body) according to Embodiment 1.

As is apparent from FIG. 20A, slot 41 overlaps the respective parts of the non-winding part and winding part of core 11 of antenna 8. The term "overlapping" referred to here may be either contacting or non-contacting. However, at least back cover 3 (metal body) is insulated from antenna 8. That is, one of region A, region B, and region C in FIG. 2 partially overlaps slot 41. Both region A and region C need not necessarily overlap slot 41, but at least region B overlaps slot 41. As shown in FIG. 20B, antenna 8 partially overlaps back cover 3 and the other part thereof overlaps slot 41. However, although the center line of slot 41 in the lateral direction of FIG. 20B need not overlap the center line of antenna 8, part of the right side and part of the left side of antenna 8 preferably overlap back cover 3 and the central part positioned between part of the right side and part of the left side of antenna 8 preferably overlaps slot 41.

When antenna 8 is operated with such an arrangement, a current flows through an antenna pattern as shown in FIG. 21A first. FIG. 21A shows a case where a current flows from left to right. As a result, an eddy current in a direction opposite to the direction of the current of antenna 8, that is, a current flowing from right to left, flows through the surface of back cover 3 opposite to antenna 8 as shown in FIG. 21B. This eddy current flowing through back cover 3 also flows through the surface opposite to the surface facing antenna 8 via slot 41. The direction of the current flowing through the opposite surface is reverse to the direction (right to left) of the current flowing through the surface facing antenna 8, and the current flows from left to right. As a result, as is apparent from FIG. 22, the direction of the current flowing through the opposite surface is identical to the direction of the current flowing through the antenna pattern of antenna 8. The current flowing through the opposite surface forms a loop by circulating through the end portion along the widthwise direction of slot 41. That is, as shown in FIG. 21A, the current forms a clockwise loop and a counterclockwise loop. As a result, a magnetic field as shown in FIG. 21C is formed. That is, one of the clockwise loop and the counterclockwise loop formed by the current serves as an entrance of the magnetic field and the other serves as an exit. This is necessarily identical to the direction of the magnetic field generated by antenna 8. As a result, the magnetic field generated by back cover 3 which is the metal body never has a direction that interferes with the magnetic field of antenna 8, so that the magnetic flux of antenna 8 reaches the opposite side of the metal body. In this case, antenna 8 does not use back cover 3 which is the metal body as an antenna by exciting back cover 3, and only antenna 8 performs communication. Therefore, a better communication characteristic may be obtained when no metal body is located nearby, but even when the metal body is located nearby, antenna 8 can perform favorable communication by only forming one slot.

As a result, by only forming slot 41, even if a metal body such as back cover 3 approaches antenna 8 or antenna 8 is surrounded by a metal body, antenna 8 can perform communication as in the case where no metal body approaches antenna 8.

Furthermore, inserting a magnetic member such as core 11 into slot 41 further improves the communication characteristic of antenna 8. In this case, the magnetic member should not be inserted into the part that overlaps flexible substrate 12 but the magnetic member is inserted into the part that overlaps region A and region C of core 11. When the magnetic member inserted into slot 41 is the same material as that of the magnetic member of core 11, it is possible to further improve the communication characteristic, but a different material may also be used.

The shape of slot 41 is not limited to a rectangle but can be one of a polygon, circle, ellipse and curve and the like. The longitudinal direction of slot 41 is preferably substantially identical to the longitudinal direction of core 11 of antenna 8. FIG. 18 illustrates an embodiment in which the generally rectangular planar shape of a case of portable terminal 1 consists of a first region 3a and a second region 3b that are adjacent to each other along a longitudinal direction parallel to the two long sides of the generally rectangular planar shape. Camera 5, coil (of antenna 8), and slot 41 are arranged in first region 3a of the case, battery 4 is arranged in second region 3b of the case, and display panel 2 is arranged in both first region 3a and second region 3b of the case.

Next, a method of adjusting an inductance (L value) of the coil pattern of antenna 8 will be described. That is, the following antenna has a shape with an inductance adjusting mechanism added to antenna 8 described so far.

Figure 24:
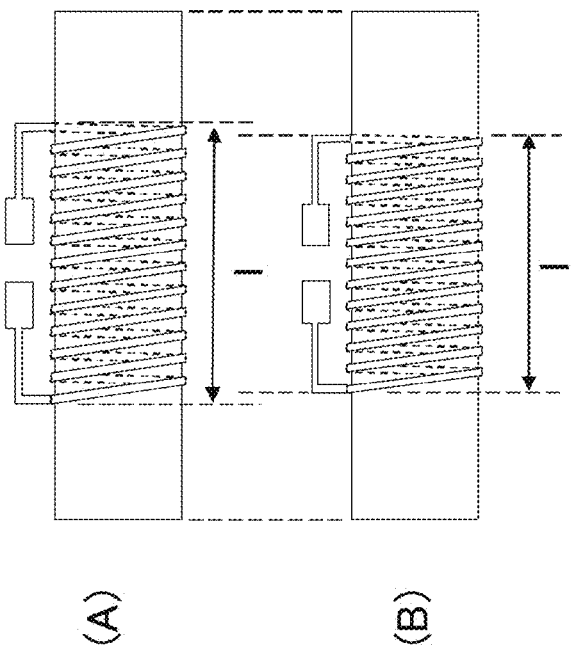
FIG. 24 is a diagram for describing a parameter that determines the inductance of the antenna according to Embodiment 1.
Figure 25:
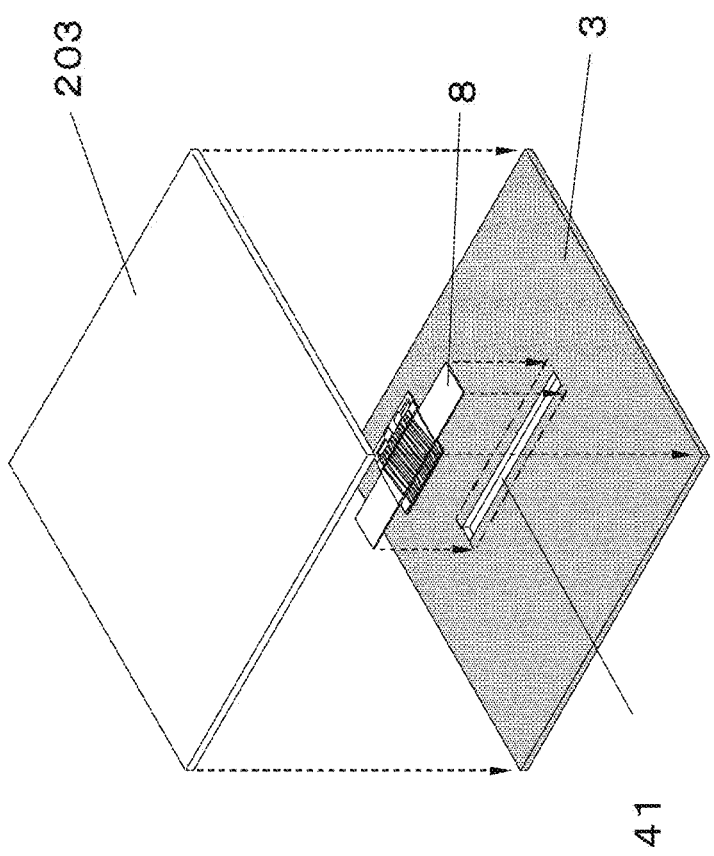
FIG. 25 is a diagram illustrating how the inductance of the antenna according to Embodiment 1 is changed by the inductance adjusting mechanism.

FIGS. 23A and 23B are top views of the antenna according to Embodiment 1 of the present invention provided with an inductance adjusting mechanism. FIG. 24 is a diagram describing a parameter that determines an inductance of the antenna according to Embodiment 1. FIG. 25 is a diagram illustrating an inductance of the antenna according to Embodiment 1 changed by the inductance adjusting mechanism.

In flexible substrate 12 of antenna 8, a lead wire making up the coil is branched into two portions at both ends thereof. "Being branched into two portions" means that branched lead wires 51 and 52 are added to lead wires 151 and 152 compared to antenna 8 shown in FIG. 2. Branched lead wires 51 and 52 are connected to lead wires 151 and 152 at both ends thereof (close to branch points 55 and 56 and trimming points 53 and 54), so that the number of turns of the coil of antenna 8 does not change. Trimming points 53 and 54 are trimmed if necessary to adjust the inductance. The term "trimming" referred to herein means snapping a lead wire at a trimming point through punching and laser processing. Therefore, trimming points 53 and 54 are preferably located outside core 11. This prevents core 11 from being damaged at the time of trimming.

The trimming points are located on lead wires 151 and 152 which are located outside, among lead wires 151 and 152, and branched lead wires 51 and 52. Therefore, in FIG. 23, trimming points 53 and 54 are located on lead wires 151 and 152, which are not branched lead wires 51 and 52. This is because the inductance is changed by snapping lead wires 151 and 152 and thereby changing the length of the coil in the axis direction. That is, when trimming is not done at trimming points, the inductance remains the same as that of the coil where none of branched lead wires 51 and 52 exists.

In contrast, according to FIG. 24, inductance L of the coil is given by $L=(\mu \times S \times N \times N)/l$ where the magnetic permeability of the magnetic core is $\mu$, the cross-sectional area of the coil is S, the number of turns of the coil is N, and the length of the coil is l. It is clear that the smaller length l of the coil, the greater is inductance L of the coil. That is, since the length of the coil is shortened by trimming at least one of trimming points 53 and 54, the inductance can be increased. Branched lead wires 51 and 52 are preferably wound by at least one or more turns around core 11 and are preferably wound around core 11 by a plurality of times as shown in FIGS. 23A and 23B. Moreover, branched lead wire 51 and branched lead wire 52 are wound by the same number of turns, and it is possible to stabilize the characteristics of antenna 8 uniformly accordingly. However, the number of turns may be different between branched lead wire 51 and branched lead wire 52. In FIGS. 23A and 23B, branched lead wires 51 and 52, and lead wires 151 and 152 are wound closely adjacent to each other, whereas lead wires at the center where branched lead wires 51 and 52 do not exist are wound sparsely adjacent to each other. It is thereby possible to make the winding part more compact. On the other hand, since all the lead wires in the central part, branched lead wires 51 and 52, and lead wires 151 and 152 are wound adjacent to each other at an identical interval, it is possible to form easily-manufacturable antenna 8.

FIG. 25 compares the inductances of antenna 8 between a case with a free space (metal body is not in proximity to antenna 8), a case where back cover 3 (metal body) with a 40 mm×4 mm slot is in proximity to antenna 8) and a case where back cover 3 (metal body) with a 40 mm×1 mm slot is in proximity to antenna 8). Although the inductance changes for each of the above-described three patterns, the change rate in inductance that changes by snapping trimming points 53 and 54 is approximately the same level such as 4.6 to 5%. Note that the change rate when only one of trimming points 53 and 54 is disconnected is reduced to half, that is, approximately 2.3 to 2.5%. In this case, not only back cover 3 but also other metal plate 203 is in proximity to antenna 8. That is, it is observed that antenna 8 according to Embodiment 1 provided with slot 41 can adjust the inductance and perform communication even in a situation in which antenna 8 is surrounded by a metal body.

Embodiment 2

In Embodiment 2, antenna 80 is slightly different in shape from antenna 8 described in Embodiment 1. However, the basic configuration and operating principles remain the same and since the shape of antenna 80 is different from that of antenna 8, slot 41 in Embodiment 1 is changed into round hole 42. Therefore, components assigned identical reference numerals basically represent identical components.

Figure 26:
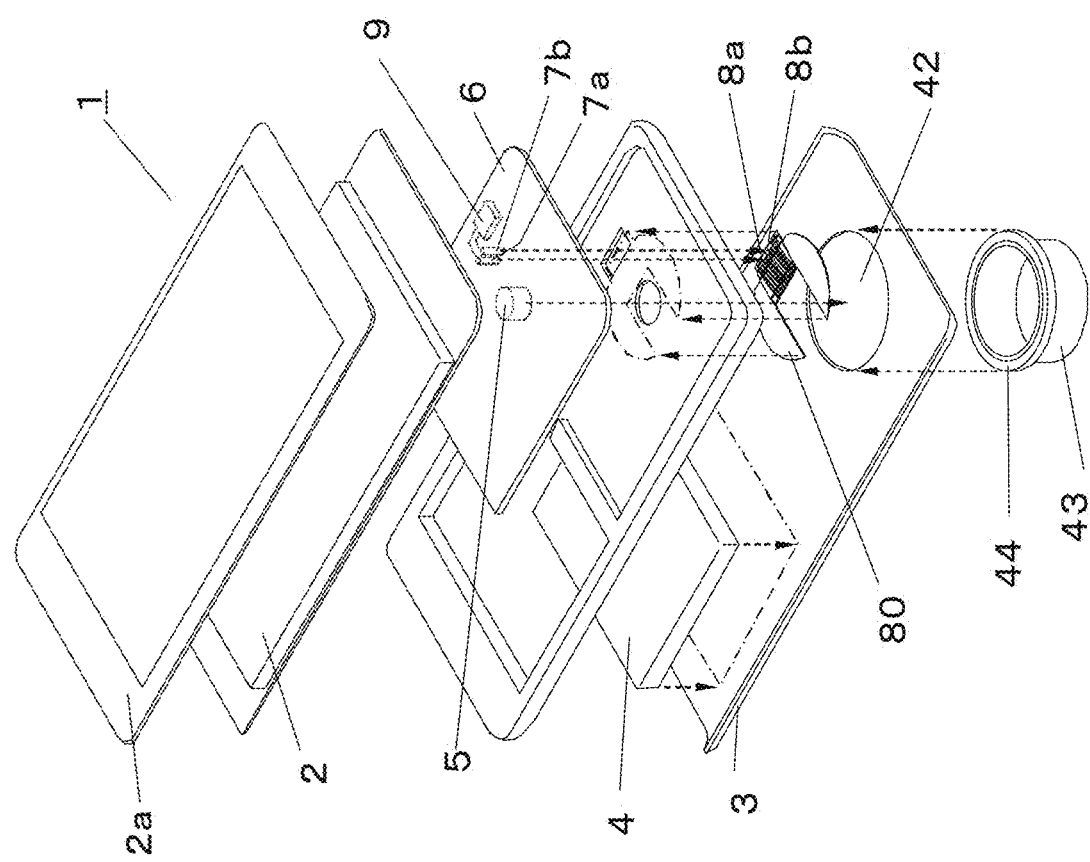
FIG. 26 is an exploded perspective view of a portable terminal in which an antenna according to Embodiment 2 is mounted.
Figure 27:
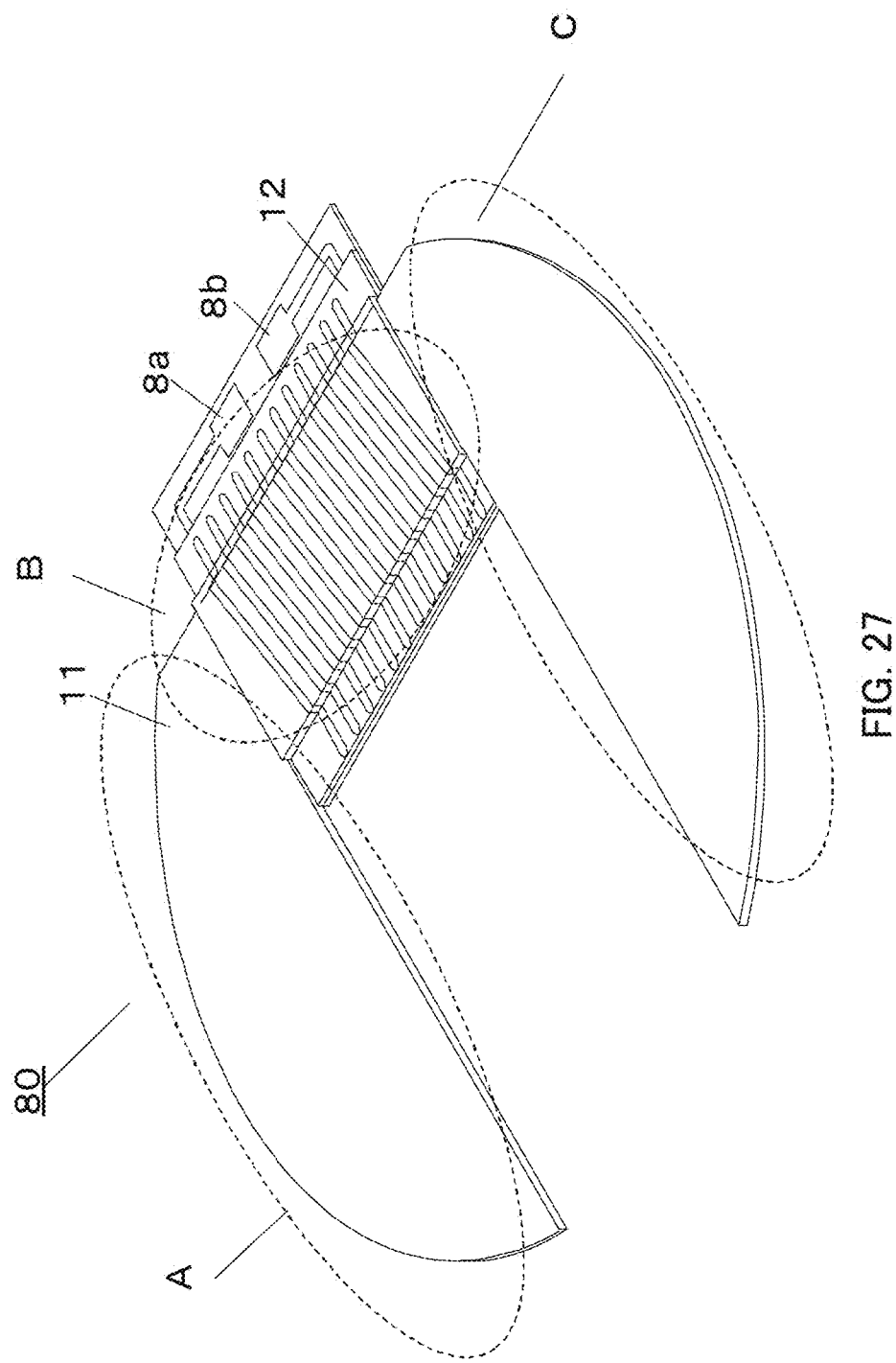
FIG. 27 is a perspective view of the antenna according to Embodiment 2.
Figure 28:
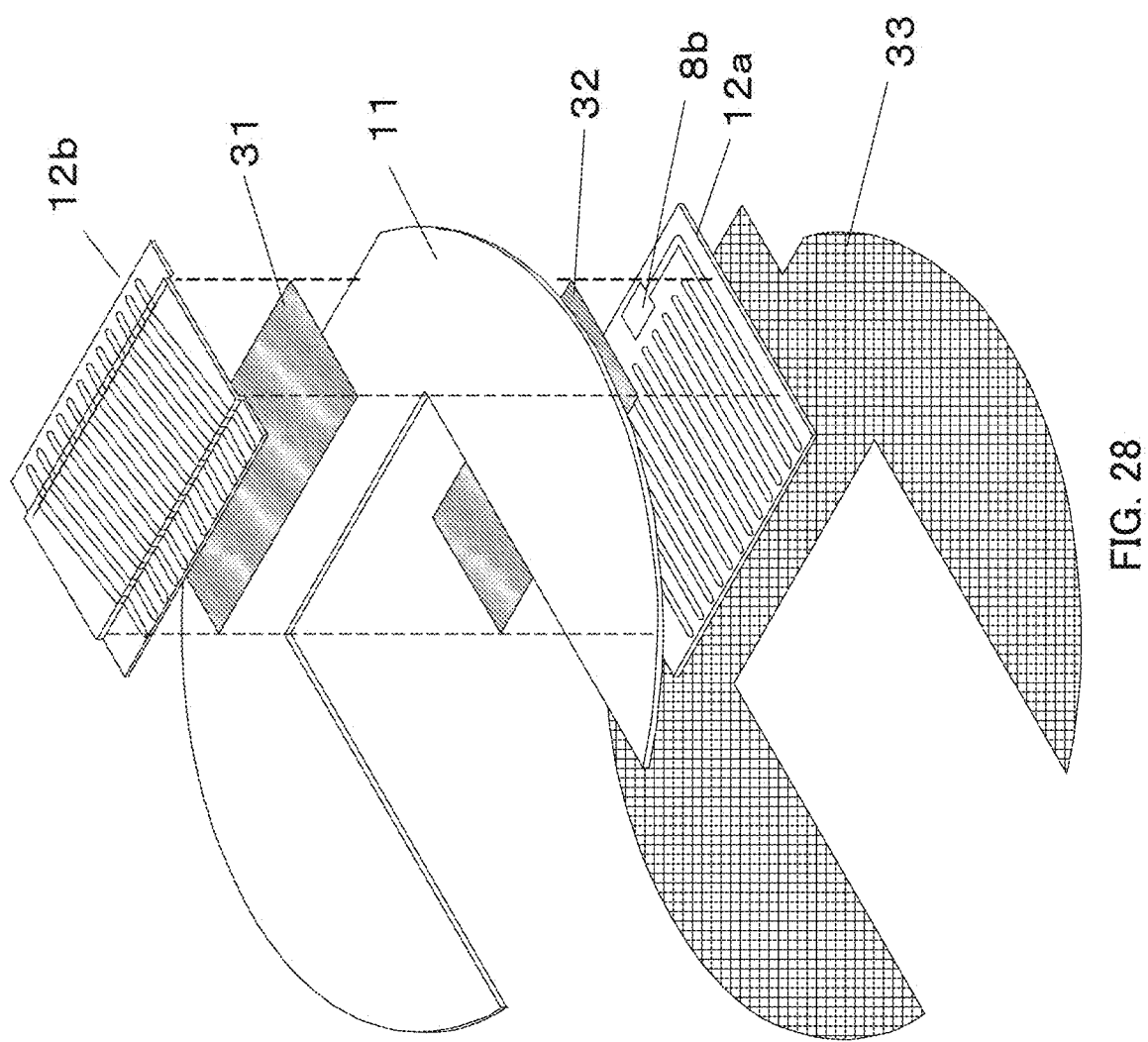
FIG. 28 is an exploded perspective view of the antenna according to Embodiment 2.
Figure 29:
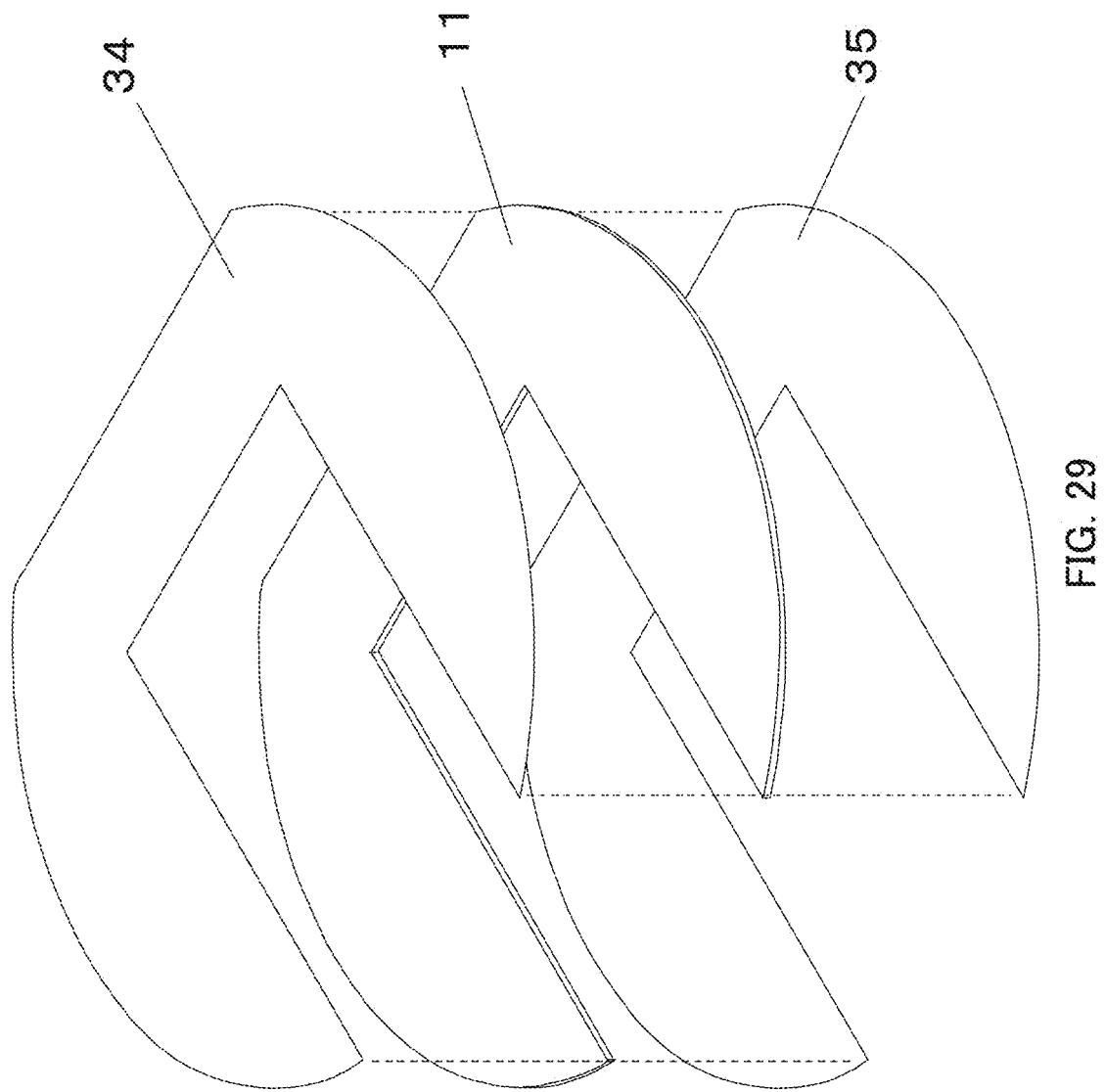
FIG. 29 is a perspective view of a core according to Embodiment 2.

FIG. 26 is an exploded perspective view of a portable terminal in which an antenna according to Embodiment 2 is mounted. FIG. 27 is a perspective view of the antenna according to Embodiment 2. FIG. 28 is an exploded perspective view of the antenna according to Embodiment 2. FIG. 29 is a perspective view of a core according to Embodiment 2.

Antenna 80 according to Embodiment 2 includes core 11 including at least a first surface and a second surface which is a back surface thereof, a coil winding part (region B) around which a coil is wound so that a lead wire passes on the first surface and the second surface, two no-coil winding parts (region A and region C) of the first surface and second surface around which no coil is wound, and the coil winding part is positioned between a plurality of no-coil winding parts in the axis direction of the coil and the plurality of no-coil winding parts are respectively inclined in an identical direction relative to the coil axis. Note that the coil winding part may be divided into two or more portions and each region between neighboring portions may be designated as a no-coil winding part.

That is, as one of points changed from Embodiment 1, in antenna 80, the area of the no-coil winding part (regions A and C) is greater than the area of the coil winding part (region B) as shown in FIG. 27. It goes without saying that the area of the no-coil winding part (regions A and C) need not always be greater than the area of the coil winding part (region B), but even a small coil winding part can thereby achieve a favorable communication characteristic. Since regions A to C are not arranged linearly, antenna 80 as a whole forms a C-shape or a right-square-bracket shape. That is, one end sides of region A and region C are connected to region B and the other end sides of region A and region C face each other with a certain distance therebetween. Region A and region C are inclined (bent) toward the left side in FIG. 27 relative to the coil axis of the coil winding part. That is, the longitudinal direction of region A and region C is the winding direction of the coil of antenna 80 (direction perpendicular to the winding axis of the coil), and core 11 in region A and region C protrudes from the width of the coil winding part (region B). In FIG. 27, core 11 in region A and region C extends leftward to form a C-shape, but core 11 may also extend leftward and rightward to form an H-shape. The two regions may extend in different directions; region A extending rightward and region B extending leftward, for example, and in such a case, at least some of factors that determine the characteristic such as the size, thickness or shape of region A and region B are preferably different. Core 11 of region A and core 11 of region C face each other with a certain distance therebetween outside the coil winding part of region B in the winding direction. Core 11 of region A and core 11 of region C are parallel to each other and the distance therebetween is fixed, but the present invention is not limited to this. In FIG. 27, the certain distance between core 11 of region A and core 11 of region C is assumed to be on the order of the length of the coil in the axis direction. Core 11 of region A and core 11 of region C are never connected together.

As shown in FIG. 26, another part such as camera 5 to be mounted on portable terminal 1 may also be disposed in the region surrounded by regions A, B and C. That is, compared to antenna 8 according to Embodiment 1, portable terminal 1 provides a structure in which other components can easily coexist even within a compact portable terminal.

When no metal body is located nearby, region A or region C serves as an entrance or an exit of a magnetic flux as in the case of Embodiment 1, and it is thereby possible to form antenna 80 that enables wide-range and stable communication and achieve effects similar to those in Embodiment 1.

The shape of core 11 in region A and region C may be any given shape. In FIG. 27, the outside shape of core 11 is curved so that the outside shape of core 11 comes close to roundness conforming with round hole 42 in FIG. 26, but the present invention is not limited to this. Moreover, core 11 in region A and region C may be formed to be thinner than core 11 in region B to thereby achieve further compactness.

As shown in FIG. 26, hole 42 is circular, larger than antenna 80 and entire antenna 80 is exposed from hole 42. That is, antenna 80 does not overlap back cover 3. The size of antenna 80 may be increased so that antenna 80 overlaps back cover 3, but if the size of antenna 80 is assumed to be fixed, antenna 80 is preferably smaller than hole 42 and entire antenna 80 is preferably exposed as shown in FIG. 26. Cap 43 which covers antenna 80 may be provided for hole 42. At this time, if cap 43 is a metal body, frame 44 is provided around cap 43 of an insulator such as resin. Frame 44 has a function of forming a gap between back cover 3 (metal body) and cap 43.

As shown in FIG. 28, the structure of antenna 80 is basically the same as that of antenna 8 in FIG. 3. In both FIG. 3 and FIG. 28, double-coated adhesive tape 33 is attached to lower flexible substrate 12a and pasted to other components (e.g., back cover 3 or electronic circuit board 6), but double-coated adhesive tape 33 may be attached to upper flexible substrate 12b. However, in that case, care should be taken to avoid external connection terminals 8a and 8b provided for lower flexible substrate 12a from being covered with double-coated adhesive tape 33.

As shown in FIG. 29, since core 11 is protected by protective tapes 34 and 35 of the same shape, even when core 11 in region A and region C is exposed from flexible substrate 12, this will pose no problem. Although region A and region C need not have the same shape or same size, region A and region C always need to protrude from the coil.

Figure 30:
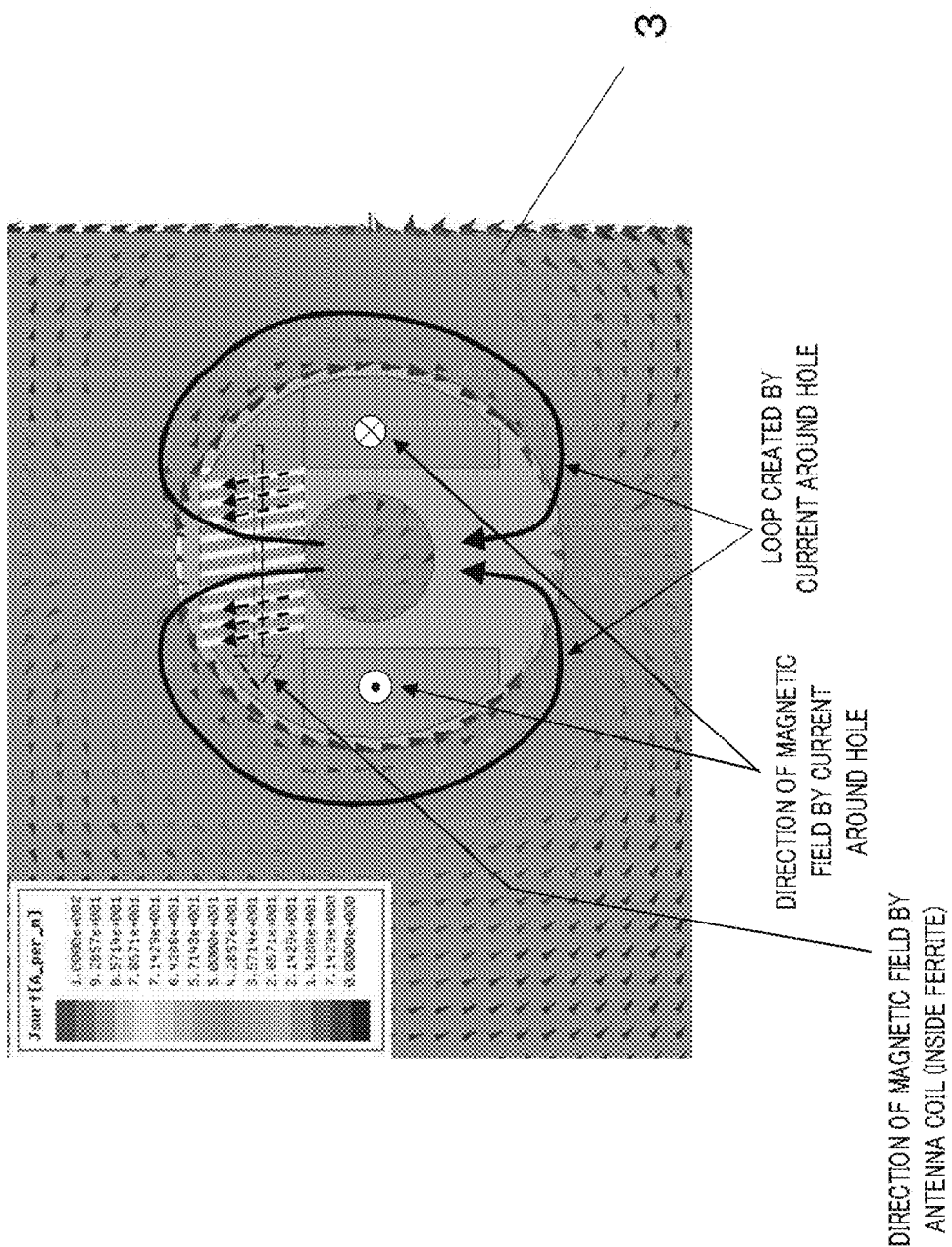
FIG. 30 is a diagram illustrating a current flowing through a metal plate by the antenna according to Embodiment 2.
Figure 31:
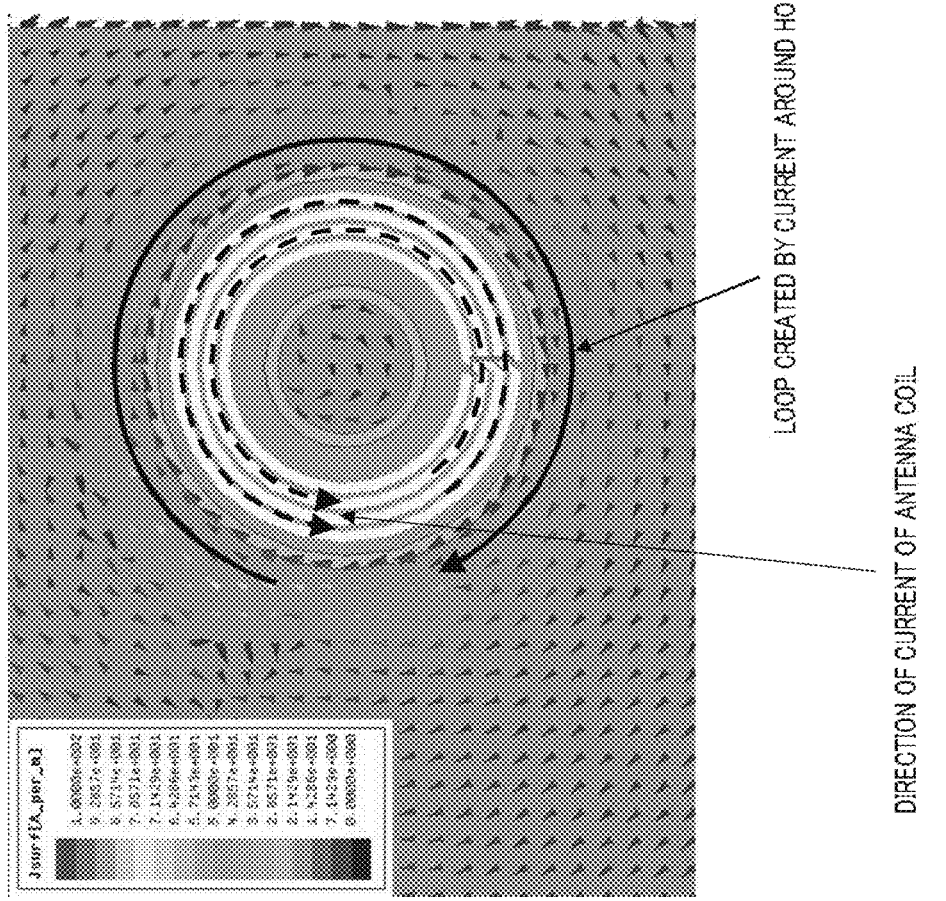
FIG. 31 is a diagram illustrating a current flowing through a metal plate by the conventional antenna.
Figure 32:
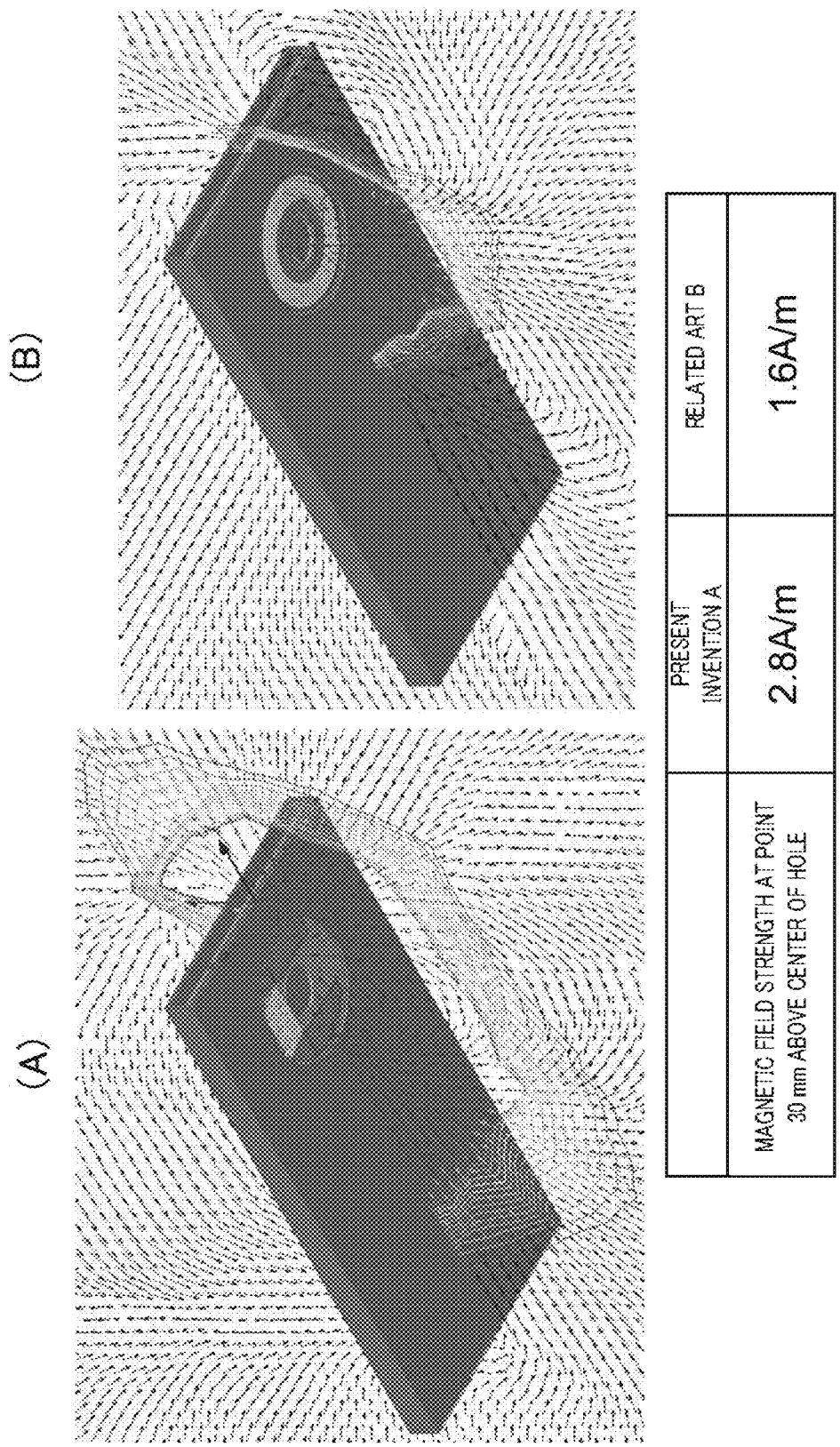
FIG. 32 is a diagram illustrating a magnetic field formed by the antenna according to Embodiment 2 and the conventional antenna.

Next, a magnetic field formed by antenna 80 when a metal body (back cover 3) is located nearby will be described. FIG. 30 is a diagram illustrating a current flowing through a metal plate by the antenna according to Embodiment 2. FIG. 31 is a diagram illustrating a current flowing through a metal plate by the conventional antenna. FIG. 32 is a diagram illustrating a magnetic field formed by the antenna according to Embodiment 2 and a conventional antenna. In FIG. 32, a case with the antenna according to Embodiment 2 is illustrated as (A), and a case with the conventional antenna is illustrated as (B). In FIGS. 31 and 32, holes formed in back cover 3 (metal body) have the same size. A ring-shape loop antenna is adopted as the conventional antenna.

According to principles basically the same as the principles in FIG. 21, when a current directed from bottom to top flows through the coil of antenna 80 as is apparent from FIG. 30, the direction of the magnetic flux in region B is from right to left. As a result, the non-winding part of core 11 on the right side in the diagram (e.g., region C) serves as an entrance of the magnetic flux and the non-winding part of core 11 on the left side in the diagram (e.g., region A) serves as an exit of the magnetic flux. As a result, a large magnetic field as shown as (A) in FIG. 32 is formed. In this case, an eddy current that tries to cancel out the magnetic field generated by antenna 80 is generated on an inner surface of back cover 3 (surface on the antenna 80 side). A point in the present invention is that two eddy currents flowing through back cover 3 exist on a single surface; a clockwise eddy current and a counterclockwise eddy current. For this reason, the eddy currents of respective directions cannot form a loop current path, but the respective eddy currents run back and forth between the front surface (outer surface) and the back surface (inner surface) of back cover 3. As a result, the current direction differs between the front surface (outer surface) and the back surface (inner surface). Since the eddy current flowing through the back surface (inner surface) has an action of canceling out the magnetic flux of antenna 80, the eddy current flowing through the front surface (outer surface) flows in a direction in which it supports the magnetic flux of antenna 80.

As a result, the communication characteristic of antenna 80 excels when it is not surrounded by the metal body as in the case of Embodiment 1, but even if it is surrounded by the metal body, an eddy current that forms a magnetic flux in a direction identical to the direction of the magnetic flux of antenna 80 flows through the metal body, and antenna 80 can thereby perform communication sufficiently.

On the other hand, the conventional antenna shown in FIG. 31 is not like the present invention. That is, when a counterclockwise current flows through the loop antenna, a clockwise current flows around hole 42 in the inner surface of back cover 3 so as to cancel it out. Since this current does not move between the outer surface and the inner surface of back cover 3, a clockwise current flows through the outer surface of back cover 3. As a result, back cover 3 only functions to weaken the magnetic field generated by the loop antenna, causing the communication characteristic of the loop antenna to deteriorate.

Consequently, it is apparent from FIG. 32 that antenna 80 according to Embodiment 2 forms a larger magnetic field than the conventional antenna. Particularly, the magnetic field strength at a point 30 mm above the center of hole 42 is obviously better in antenna 80. Note that a common condition in FIG. 32 is that input to the antenna is 100 mV, the size of the case is 60 mm×120 mm×8 mm, the thickness of the case is 1 mm, and the case is made of magnesium. The diameter of hole 42 is 30 mm and the outside diameter of antenna 80 is 28 mm.

Compared to antenna 8 according to Embodiment 1, antenna 80 in FIG. 27 includes region A and region C facing each other in substantially parallel. Therefore, the center of antenna 80 is not located above the coil winding part (region B) and located above the region surrounded by region A and region C. As a result, the magnetic field generated by antenna 80 is more likely to move above the region surrounded by region A and region C than above the coil winding part of antenna 80. Therefore, a place where the magnetic field generated by antenna 80 is strongest, that is, a place where the communication counterpart can perform communication most easily is above the region surrounded by region A and region C than above the coil winding part of antenna 80. Thus, Embodiment 2 can freely change a place above antenna 80 where communication can be performed easily by adjusting the shape, size, thickness, inclination of the coil winding part with respect to the coil axis or the like of the no-coil winding part (region A and region C).

In contrast, the center of antenna 8 according to Embodiment 1 is located on the coil and the place where the magnetic field generated by antenna 8 is strongest lies substantially above the coil As is apparent from the diagram in FIG. 15, the center of antenna 8 is located about the center of portable terminal 1 according to Embodiment 1 in the width direction (widthwise direction). By so doing, the user can improve communication by aligning the center of portable terminal 1 in the width direction with the communication counterpart and thereby improve usability. In contrast, when the place communication can be performed most easily is shifted from the center of portable terminal 1 in the width direction, the user needs to check which part of portable terminal 1 should be aligned with the communication counterpart every time. For this reason, in Embodiment 1, the coil part is preferably always located near the center of portable terminal 1 in the width direction and the degree of freedom of the arrangement of antenna 8 is thereby limited. Camera 5 in particular is generally often located at the center of portable terminal 1 in the width direction, and so the coil part may overlap camera 5.

On the other hand, antenna 80 can adjust the position of the portion with the strongest magnetic field by adjusting the size and/or shape of core 11. The shape of core 11 of antenna 80 is not limited to the C-shape, and the angles of region A and region C with respect to the coil may be adjusted to any angle other than 90 degrees. Thus, the position of the portion with the strongest magnetic field can be adjusted to the right side or left side in FIG. 27. That is, if the portion with the strongest magnetic field is preferred to be separated from the coil winding part, the coil axis of the coil winding part may be set to have a substantially right angle (on the order of ±10 degrees or less) with respect to core 11 of the no-coil winding part and core 11 may be preferably formed to be larger so that the no-coil winding part in the longitudinal direction is extended. If the portion with the strongest magnetic field is preferred to be located closer to the coil winding part, the core of the no-coil winding part need not be made smaller, but the angle of inclination of the coil axis of the coil winding part with respect to core 11 of the no-coil winding part may be brought closer to parallel.

Next, a case where cap 43 is attached to antenna 80 will be described. Cap 43 may be resin (non-conductive body) or metal body (conductive body). If cap 43 is a non-conductive body, this can be invariably used according to the aforementioned principles. That is, there is almost no influence of cap 43 on the magnetic field. Hereinafter, a case will be described where cap 43 is a conductive body such as a metal body.

Figure 33:
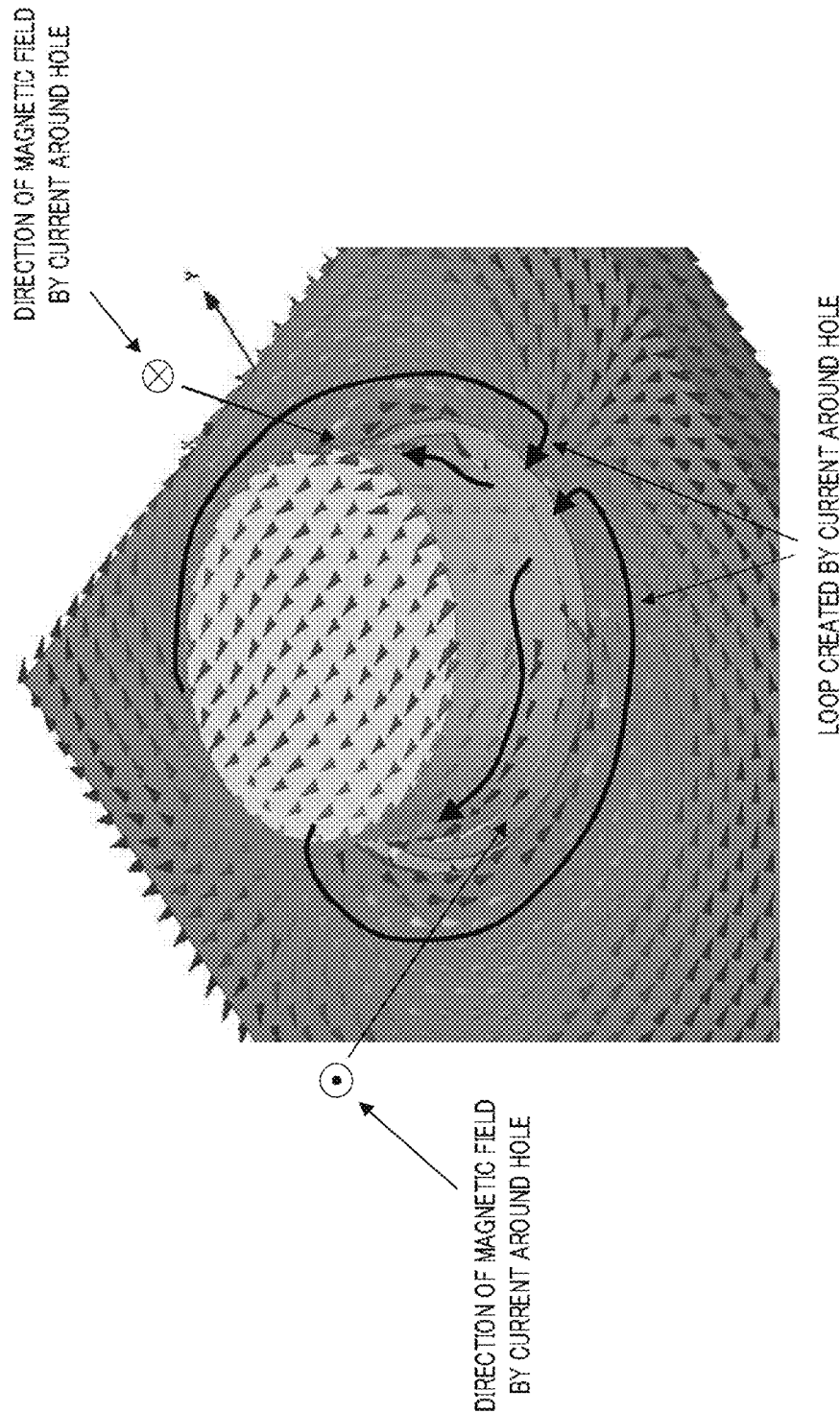
FIG. 33 is a diagram illustrating a current when there is a cap in the antenna according to Embodiment 2.
Figure 34:
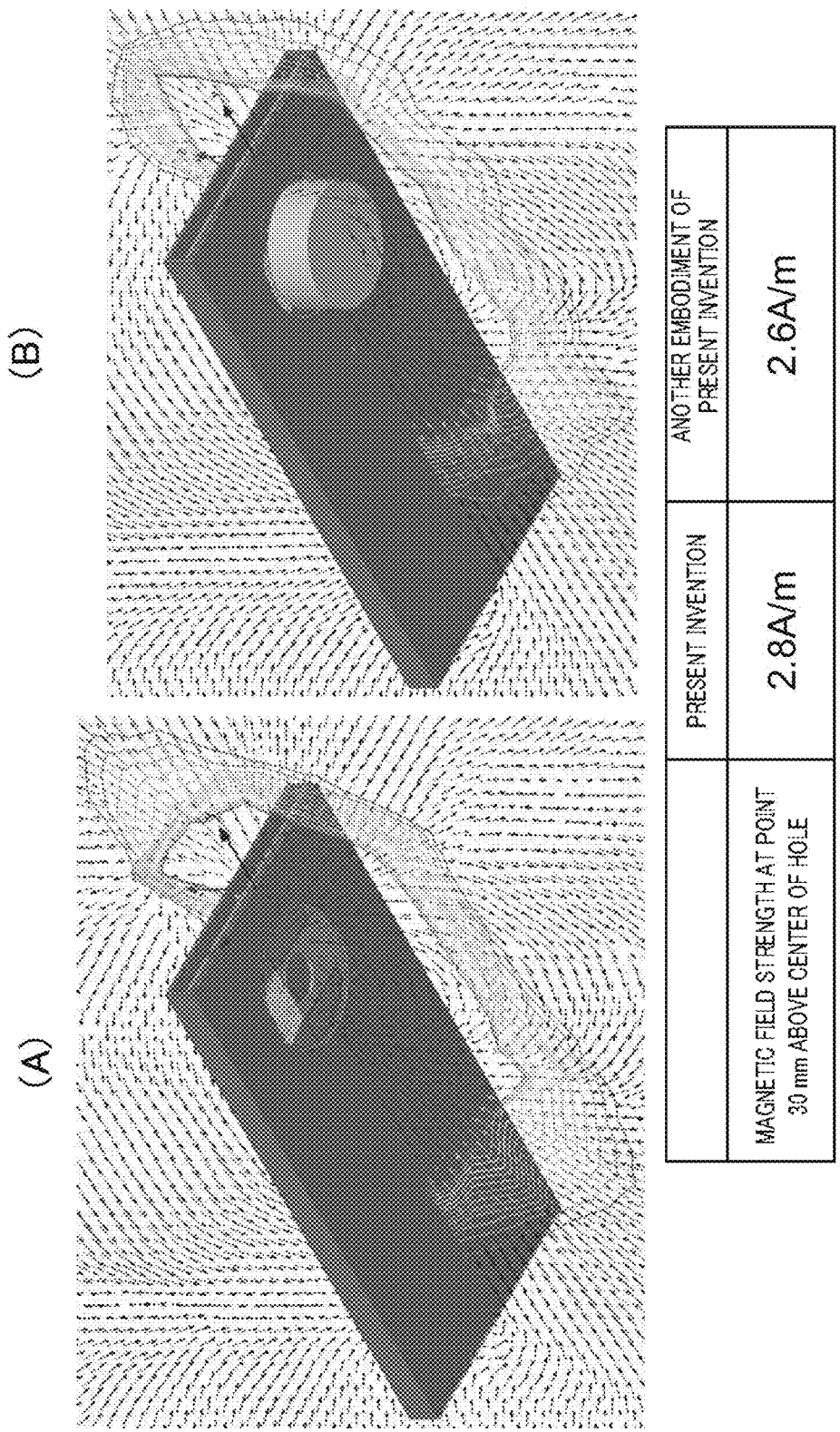
FIG. 34 is a diagram illustrating a magnetic field with a cap and without a cap in the antenna according to Embodiment 2.

FIG. 33 is a diagram illustrating a current when there is a cap in the antenna according to Embodiment 2. FIG. 34 is a diagram illustrating a magnetic field when there is a cap and when there is no cap in the antenna according to Embodiment 2. In FIG. 34, a case where there is no cap is illustrated as (A) while a case where there is a cap is illustrated as (B). FIG. 35 is a diagram illustrating a connection between the cap and the back cover in the antenna according to Embodiment 2.

It is observed from FIG. 33 that a current also flows through the outer surface (top surface) of cap 43 in a direction identical to that of an eddy current flowing through the outer surface (top surface) of cap 43. This is because as in the case of back cover 3, an eddy current that cancels out the magnetic flux of antenna 80 flows through the inner surface (back surface) of cap 43 and the eddy current runs back and forth between the inner surface and the outer surface of cap 43. That is, as a result, an eddy current that generates a magnetic flux in a direction identical to that of the magnetic flux of antenna 80 flows through the outer surface of cap 43. As shown in FIG. 34, the case illustrated as (A) where there is no metal cap 43, the communication characteristic of antenna 80 is stronger and a stronger magnetic field is formed compared to the case illustrated as (B) where there is metal cap 43, but the difference is very small. Note that, in FIG. 34, input to the antenna is 100 mV, the size of the case is 60 mm×120 mm×8 mm, the thickness of the case is 1 mm and the case is made of magnesium. Note that cap 43 has a cylindrical shape having an outside diameter of 26 mm and a height of 10 mm.

When back cover 3 and cap 43 are connected together, this means that metals contact each other. That is, eddy currents flowing through back cover 3 and cap 43 flow back and forth via contact portion 45. In the case of a 1-point connection, back cover 3 and cap 43 may be connected at any part. However, when they are connected at a plurality of points, if region X and region Y in FIG. 35 are connected simultaneously, performance deteriorates. This is because, in region X and region Y, eddy currents flowing through back cover 3 and cap 43 flow back and forth between the front surface and the back surface. Therefore, when back cover 3 and cap 43 are connected together in region X and region Y, it is difficult for the current to flow back and forth between the front surface and the back surface. For such a reason, when connection portion 45 is provided, providing one such portion makes it possible to receive fewer effects of the connection and maintain the communication characteristic of antenna 80.

As described above, antennas 8 and 80 according to Embodiments 1 and 2 maintain a favorable characteristic as antennas even when no metal is located nearby and maintain a favorable characteristic as antennas if a metal is located nearby by only applying small work on the metal. Regarding work on the metal, when one surface of the metal faces antenna 8 or 80 and an eddy current that interferes with antenna 8 or 80 flows through this one surface, but it is necessary to make this eddy current loop reach the other surface. This other surface is the communication surface. Note that the one surface need not always face antenna 8 or 80, but the antenna 8 or 80 side has a surface. Furthermore, the shape of the metal need not always be tabular, but only needs to have the other surface opposite to the surface on the antenna side. These surfaces are not perpendicular to the axis direction of the coil of antenna 8 or 80 and preferably parallel thereto.

The disclosures of Japanese Patent Applications No. 2013-083534, filed on Apr. 12, 2013, and No. 2013-104718, filed on May 17, 2013, including the specifications, drawings, and abstracts are incorporated herein by reference in their entireties.

INDUSTRIAL APPLICABILITY

According to the present invention, it is possible to provide a small antenna with a stable inductance value and maintain an antenna communication characteristic, and therefore the present invention is useful as an antenna, an antenna apparatus and a communication apparatus for various electronic devices such as mobile phone. The present invention is applicable particularly to storage racks that allow automatic merchandise management, book management or the like, pharmaceuticals management other than showcases, hazardous materials management, or valuable goods management system or the like.

REFERENCE SIGNS LIST

1 Portable terminal
2 Display panel
3 Back cover
4 Battery
5 Camera
6 Electronic circuit board
7a, 7b Antenna input and output pin
8, 80 Antenna
8a, 8b External connection terminal
9 Antenna control section
11 Core
12 Flexible substrate
12a Lower flexible substrate
12b Upper flexible substrate
41 Slot
51, 52 Branched lead wire
53, 54 Trimming point
55, 56 Branch point

The invention claimed is:

1. A communication apparatus comprising:
a front cover including a touch display panel;
a back cover formed of a metal body, the front cover and the back cover forming a case;
a camera supported by the case;
a battery housed in the case; and
a coil housed in the case; wherein
the case has a generally rectangular planar shape including two long sides and two short sides, the generally rectangular planar shape consisting of a first region and a second region that are adjacent to each other along a longitudinal direction parallel to the two long sides of the generally rectangular planar shape,
the metal body forming the back cover of the case includes an elongated slot adjacent to the coil, wherein the elongated slot is isolated from an opening provided for a lens of the camera, and is at least partially filled with a filling material,
the elongated slot and the opening provided for the lens of the camera are arranged side by side along and adjacent to one of the two short sides of the generally rectangular planar shape,
the camera, the coil, and the elongated slot are arranged in the first region of the case,
the battery is arranged in the second region of the case, and
the touch display panel forming the front cover of the case is arranged in both the first region and the second region of the case.

2. The communication apparatus according to claim 1, wherein the elongated slot and the opening provided for the lens of the camera are arranged along a direction parallel to the one of the two short sides of the generally rectangular planar shape.

3. The communication apparatus according to claim 1, further comprising an electronic circuit board arranged at least in the first region of the case.

4. The communication apparatus according to claim 1, wherein the elongated slot is not an opening provided for a lens of a second camera.

5. A communication apparatus comprising:
a front cover including a touch display panel;
a back cover formed of a metal body, the front cover and the back cover forming a case;
a camera including a camera lens supported by the case;
a battery housed in the case; and
a coil housed in the case; wherein
the case has a generally rectangular planar shape including two long sides and two short sides, the generally rectangular planar shape consisting of a first region and a second region that are adjacent to each other along a longitudinal direction parallel to the two long sides of the generally rectangular planar shape,
the metal body forming the back cover of the case includes an elongated slot adjacent to the coil, wherein the elongated slot is isolated from an opening provided for the camera lens, and is at least partially filled with a filling material,
the elongated slot and the opening provided for the lens of the camera are arranged side by side along and adjacent to one of the two short sides of the generally rectangular planar shape,
the camera lens, the coil, and the elongated slot are arranged in the first region of the case,
the battery is arranged in the second region of the case, and
the touch display panel forming the front cover of the case is arranged in at least one of the first region and the second region of the case.

6. The communication apparatus according to claim 5, wherein the elongated slot and the opening provided for the camera lens are arranged along a direction parallel to the one of the two short sides of the generally rectangular planar shape.

7. The communication apparatus according to claim 5, further comprising an electronic circuit board arranged at least in the first region of the case.

8. The communication apparatus according to claim 5, wherein the touch display panel is arranged in both the first region and the second region of the case.

9. The communication apparatus according to claim 5, wherein the elongated slot is not an opening provided for a second camera lens.

\* \* \* \* \*